US009619510B2

United States Patent
Shimono

(10) Patent No.: US 9,619,510 B2
(45) Date of Patent: Apr. 11, 2017

(54) INFORMATION PROCESSING APPARATUS AND COMPUTER-READABLE MEDIUM STORING INFORMATION PROCESSING PROGRAM

(71) Applicant: FUJITSU LIMITED, Kawasaki-shi, Kanagawa (JP)

(72) Inventor: Akio Shimono, Yokohama (JP)

(73) Assignee: FUJITSU LIMITED, Kawasaki (JP)

(*) Notice: Subject to any disclaimer, the term of this patent is extended or adjusted under 35 U.S.C. 154(b) by 222 days.

(21) Appl. No.: 13/910,329

(22) Filed: Jun. 5, 2013

(65) Prior Publication Data

US 2013/0304762 A1 Nov. 14, 2013

Related U.S. Application Data

(63) Continuation of application No. PCT/JP2010/072212, filed on Dec. 10, 2010.

(51) Int. Cl.
G06F 17/30 (2006.01)

(52) U.S. Cl.
CPC .. *G06F 17/30386* (2013.01); *G06F 17/30091* (2013.01); *G06F 17/30887* (2013.01); *G06F 17/30902* (2013.01)

(58) Field of Classification Search
CPC ............... H04L 67/28; H04M 1/72525; G06F 17/30067; G06F 17/30902
USPC .......................................................... 707/781
See application file for complete search history.

(56) References Cited

U.S. PATENT DOCUMENTS

| 5,889,942 A | 3/1999 | Orenshteyn |
| 5,930,772 A * | 7/1999 | Gomyo ................ G06Q 20/206 705/18 |
| 6,578,078 B1 * | 6/2003 | Smith ................. G06F 17/3089 707/999.01 |
| 6,587,867 B1 * | 7/2003 | Miller et al. .................. 709/200 |

(Continued)

FOREIGN PATENT DOCUMENTS

| JP | 2002-259193 | 9/2002 |
| JP | 2003-44377 | 2/2003 |

(Continued)

OTHER PUBLICATIONS

Patent Abstracts of Japan, Publication No. 2006-302159, Published Nov. 2, 2006.

(Continued)

*Primary Examiner* — James Trujillo
*Assistant Examiner* — Jessica N Le
(74) *Attorney, Agent, or Firm* — Staas & Halsey LLP

(57) ABSTRACT

Data processing unit produces first access target information. Location information obtaining unit obtains first location information indicating the identifier of a data storage device specified by a user, as well as indicating the location of a user-specified directory within the data storage device. Location information producing unit produces second location information indicating the location of a directory that is placed below the user-specified directory and uniquely assigned to the data processing unit. Access target information producing unit produces second access target information, using the location indicated by the second location information as a reference location. Access unit makes access to the target data file in the data storage device.

14 Claims, 26 Drawing Sheets

(56) References Cited

U.S. PATENT DOCUMENTS

| | | | |
|---|---|---|---|
| 6,651,070 B1 * | 11/2003 | Hirashima | G06F 17/30303 707/770 |
| 7,809,858 B1 | 10/2010 | Brown | |
| 2002/0087559 A1 * | 7/2002 | Pratt | G06F 17/30893 |
| 2002/0120682 A1 | 8/2002 | Funaki | |
| 2003/0033429 A1 | 2/2003 | Myoki | |
| 2004/0186849 A1 | 9/2004 | Enko et al. | |
| 2007/0124500 A1 * | 5/2007 | Bedingfield, Sr. | G06F 17/30887 709/245 |
| 2008/0126446 A1 * | 5/2008 | Brunet | G06F 11/1451 |
| 2009/0089298 A1 | 4/2009 | Enko et al. | |
| 2009/0106780 A1 * | 4/2009 | Nord | G06F 9/5077 719/329 |
| 2009/0313261 A1 * | 12/2009 | Corella | H04L 63/08 |
| 2009/0313586 A1 * | 12/2009 | Sharma et al. | 715/853 |
| 2010/0205196 A1 * | 8/2010 | Schreiber | G06Q 30/0273 707/758 |
| 2013/0110906 A1 * | 5/2013 | Zearing | G06F 17/30902 709/203 |

FOREIGN PATENT DOCUMENTS

| | | |
|---|---|---|
| JP | 2004-199606 | 7/2004 |
| JP | 2004-287572 | 10/2004 |
| JP | 2006-99491 | 4/2006 |
| JP | 2006-302159 | 11/2006 |
| JP | 2007-72524 | 3/2007 |
| JP | 2010-231690 | 10/2010 |

OTHER PUBLICATIONS

Patent Abstracts of Japan, Publication No. 2006-099491, Published Apr. 13, 2006.
Patent Abstracts of Japan, Publication No. 2002-259193, Published Sep. 13, 2002.
Patent Abstracts of Japan, Publication No. 2004-199606, Published Jul. 15, 2004.
Patent Abstracts of Japan, Publication No. 2010-231690, Published Oct. 14, 2010.
Patent Abstracts of Japan, Publication No. 2007-072524, Published Mar. 22, 2007.
Patent Abstracts of Japan, Publication No. 2004-287572, Published Oct. 14, 2004.
Patent Abstracts of Japan, Publication No. 2003-044377, Published Feb. 14, 2003.
International Search Report mailed Feb. 1, 2011 in corresponding International Application No. PCT/JP2010/072212.
Chinese Office Action issued Mar. 27, 2015 in corresponding Chinese Patent Application No. 201080070451.2.
Chinese Office Action issued Nov. 2, 2015 in corresponding Chinese Patent Application No. 201080070451.2.
Chinese Office Action dated May 5, 2016 in corresponding Chinese Patent Application No. 201080070451.2.
Extended European Search Report dated Oct. 11, 2016 in corresponding European Patent Application No. 10860419.0.

* cited by examiner

FIG. 6

213 ROOT URL MANAGEMENT TABLE

| USER ID | ENDPOINT URL | USER ROOT URL |
|---|---|---|
| AB1234 | http://app1.example/<br>?userUrl=http%253A%252F%252Fd<br>ata.example%252Fshimono | http://api.data.example/user1/ |
| ⋮ | ⋮ | ⋮ |

FIG. 8

312 APPLICATION-SPECIFIC URL LIST

```
<?xml version="1.0" encoding="UTF-8" ?>
<user displayName="Shimono">
  <dataspace-list>
    <dataspace href="http://api.data-service.example/user1/app1/" for="http://app1.example.com/" />
    <dataspace href="http://api.data-service.example/user1/app2/" for="http://app2.isv1.example/" />
    <dataspace href="http://api.data-service.example/user1/app3/" for="http://app3.a-soft.example/" />
  </dataspace-list>
</user>
```

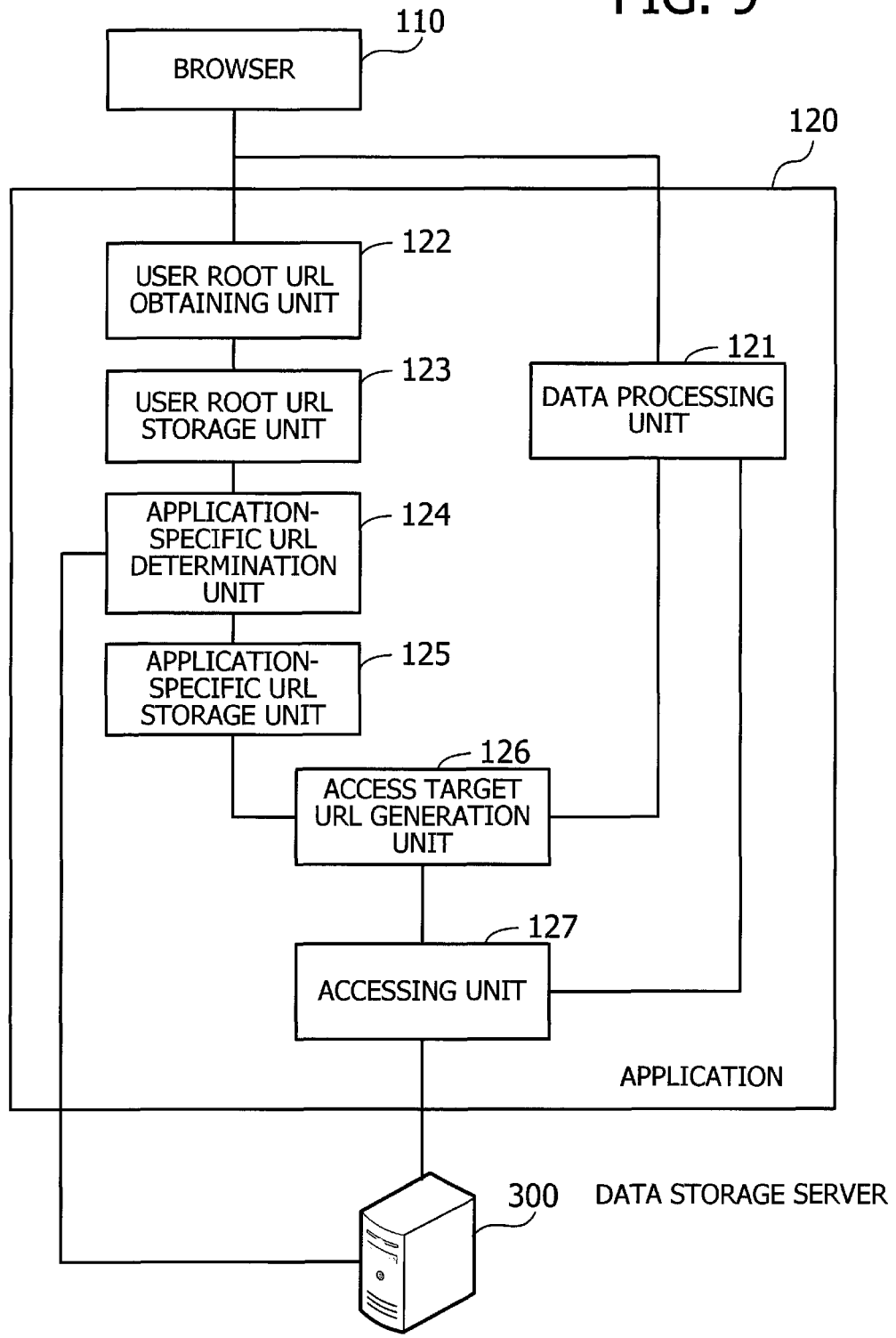

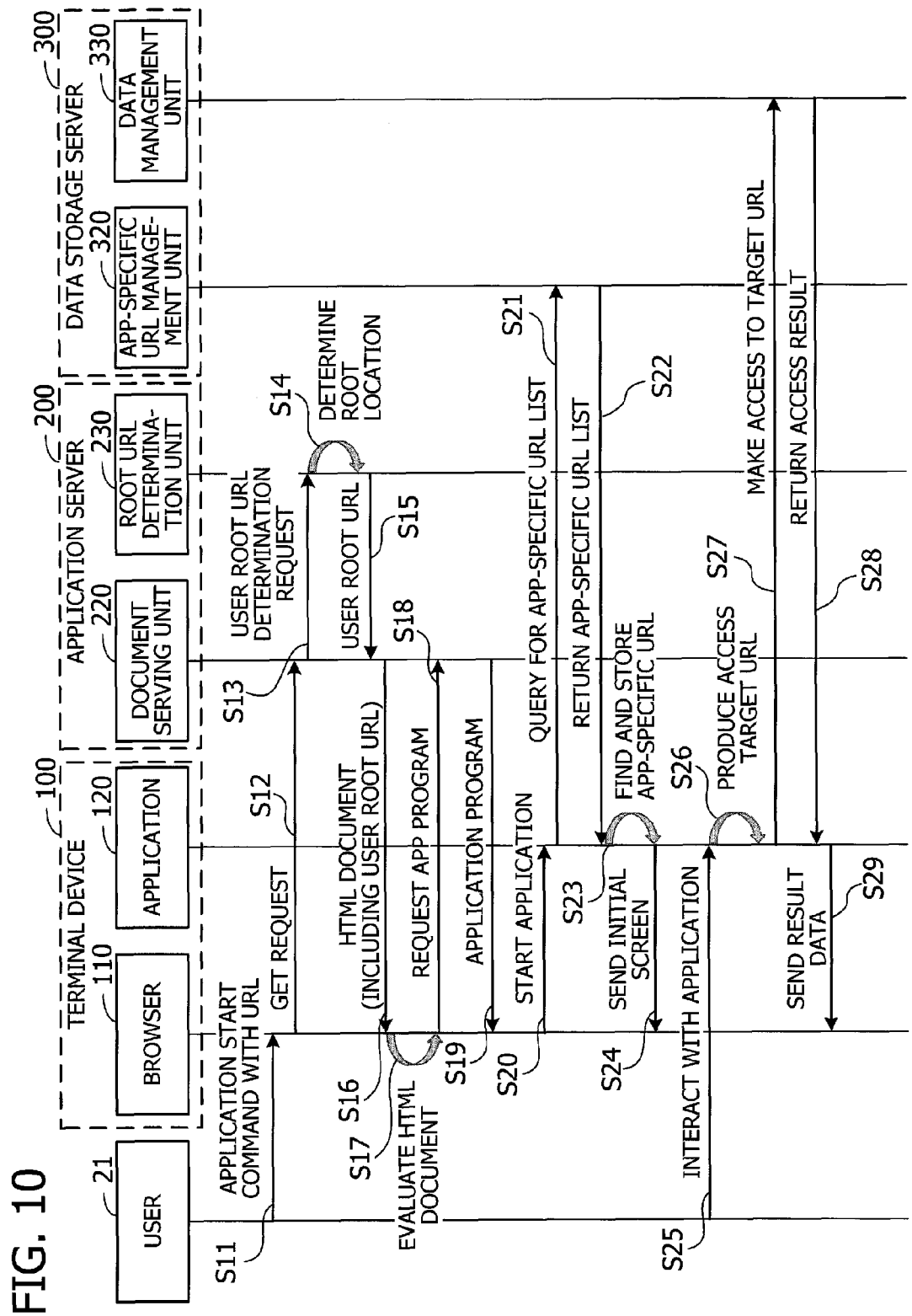

FIG. 11

30 HTML DOCUMENT

```
<!DOCTYPE html PUBLIC "-//W3C//DTD XHTML 1.0 Transitional//EN" "http://www.w3.org/TR/xhtml1/DTD/xhtml1-transitional.dtd">
<html xmlns="http://www.w3.org/1999/xhtml" lang="en" xml:lang="en">
  <head>
    <title>SAMPLE</title>
    <meta http-equiv="Content-Type" content="text/html; charset=utf-8" />
  </head>
  <body>
    <object width="100%" height="100%" data="/app1/theApp.ap1">      31
      <param name="app1vars" value="userUrl=http://api.data.example/user1/"/>   32
    </object>
  </body>
</html>
```

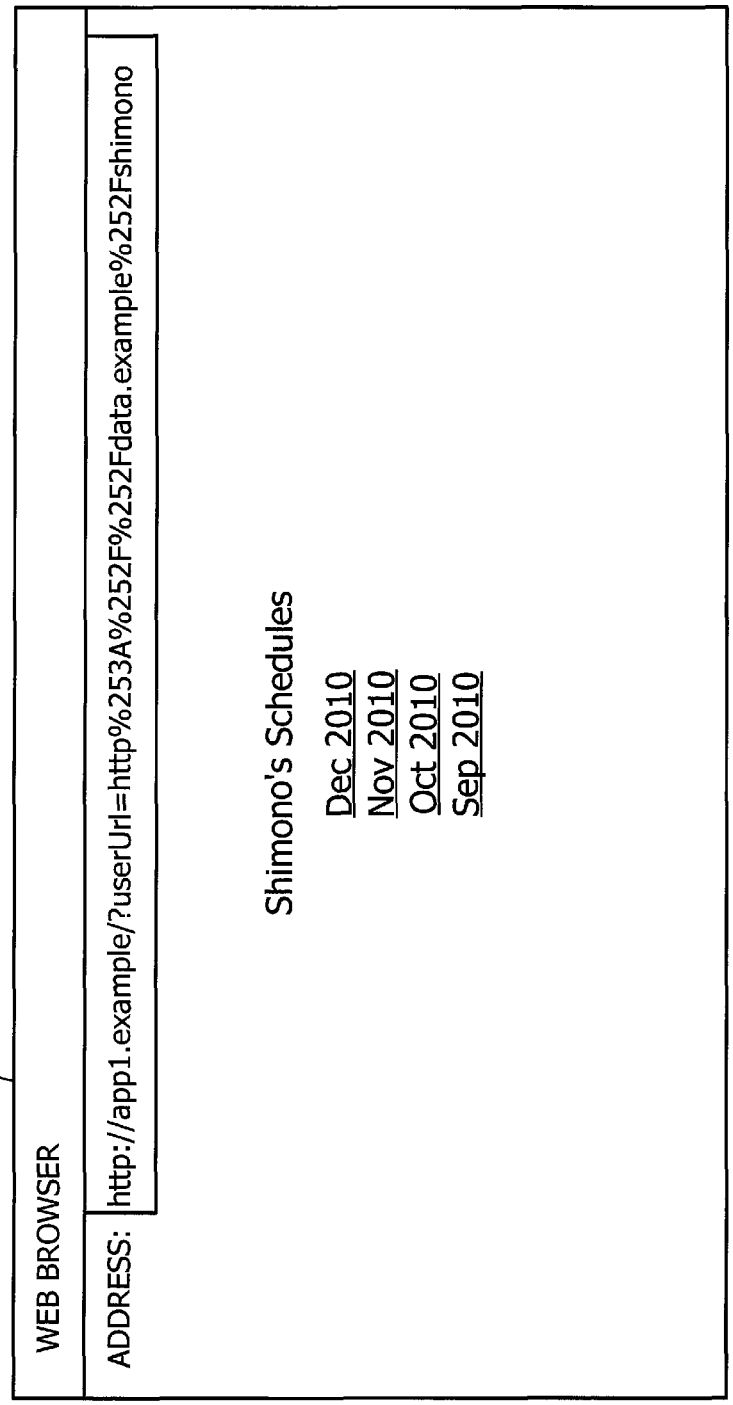

INFORMATION PROCESSING APPARATUS AND COMPUTER-READABLE MEDIUM STORING INFORMATION PROCESSING PROGRAM

CROSS-REFERENCE TO RELATED APPLICATION

This application is a continuation application of International Application PCT/JP2010/072212 filed on Dec. 10, 2010 which designated the U.S., the entire contents of which are incorporated herein by reference.

FIELD

The embodiments discussed herein relate to an information processing apparatus and a computer-readable medium storing information processing program.

BACKGROUND

Cloud computing is known as a type of services allowing users to utilize computing resources available on a network of servers, as needed, with their terminal devices and network connections. The available computer resources include, for example, data processing functions that are realized by executing application programs on a computer. Such data processing functions are referred to herein as "applications". A variety of applications are provided by many servers on the Internet. The users make access to different servers from their terminal devices, depending on what application services to use to achieve their respective purposes.

In relation to the provision of services to users, the servers may be configured to hold personal data of the users, so as to allow an application to use such data during its execution. One of the benefits of letting servers manage users' personal data is that the users can receive personalized services wherever they are. The personal data of users may include, for example, documents that they edited, attribute data (e.g., name and residence address) of individuals, and information about the environment in which they use applications (e.g., mail server name, mail address, password).

The servers on the network manage such personal data of users, and various useful techniques may be applied for this purpose. For example, one proposed system is designed to deliver data files to a requesting client terminal in encrypted form by using a cryptographic key associated with that client terminal. In this system, the client terminal can decode encrypted data files with a decryption key only if the client terminal is authenticated as the rightful destination of the files. Another proposed technique permits an application system to use a plurality of different databases in a unified manner.

Japanese Laid-open Patent Publication No. 2006-99491
Japanese Laid-open Patent Publication No. 2006-302159

Some users may use a plurality of applications provided in different servers. This means, however, that their personal data is distributed across a plurality of servers. The users are more burdened with the management of their personal data in those servers.

SUMMARY

According to an aspect of the embodiments to be discussed herein, there is provided an information processing apparatus which includes a processor configured to perform a process including: executing data processing operations requested by a user and producing first access target information in order to make access to personal data of the user, the first access target information indicating a path and a name of a target data file containing the personal data, the path pointing to the target data file by following a directory structure from a reference location; obtaining first location information indicating an identifier of a data storage device specified by the user, as well as indicating a location of a user-specified directory within the data storage device; producing, based on the first location information, second location information indicating a location of a directory that is placed below the user-specified directory and uniquely assigned to the data processing operations; producing, based on the first access target information and the second location information, second access target information indicating a storage location and name of the target data file, wherein the location indicated by the second location information is used as the reference location; and making access to the target data file in the data storage device, based on the second access target information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 illustrates an exemplary data structure of a root URL management table;

FIG. 8 illustrates an exemplary data structure of an application-specific URL list;

FIG. 9 is a block diagram illustrating exemplary functions of an application;

FIG. 10 is a sequence diagram illustrating a procedure executed in the second embodiment;

FIG. 11 illustrates an example of an HTML document including a user root URL;

FIG. 12 illustrates an example of an initial screen produced by an application;

DESCRIPTION OF EMBODIMENTS

Several embodiments will be described below with reference to the accompanying drawings. These embodiments may be combined with each other as long as there are no contradictions between them.

[First Embodiment]

The first embodiment described in this section is designed to manage personal data of a user centrally in a single place specified by the user, while allowing him or her to use applications provided in a plurality of servers. This feature of the first embodiment makes it easier for the user to manage his or her personal data, despite the use of applications in multiple servers.

The services provided in the Internet and the like are expected to have a continuing growth. This means in general that the personal data of a single user is managed separately in a plurality of servers that he or she uses.

That is, private information of a single person may be distributed across so many places that the management of such data could get out of hand because of its increased burden on the person. People have to search all the servers they are using when they happen to forget which server stores a particular piece of their personal data. Further, most servers on a wide-area network such as the Internet implement a user authentication procedure to confirm the authenticity of users before accepting their requests. This feature may degrade the usability of servers because the users have to go through the authentication procedure at each server from which they are trying to retrieve desired data. The users have also to bear a burden of managing varieties of authentication data (e.g., different pairs of user name and password) to use servers.

In view of the above, the first embodiment provides features for managing personal data of users centrally at a single server to alleviate their burden. When a user uses a plurality of applications, and if those applications store their respective data in a single directory, the shared use of the directory could lead to a conflict of data storage locations. That is, one application may overwrite an existing data location (e.g., files) created by some other application. This kind of conflict could arise when two or more applications happen to create files with the same name. The first embodiment therefore provides a function of preventing such conflict of data storage locations. This function realizes unified management of personal data with a single data storage device while allowing a plurality of applications to use the data.

Figure 1:
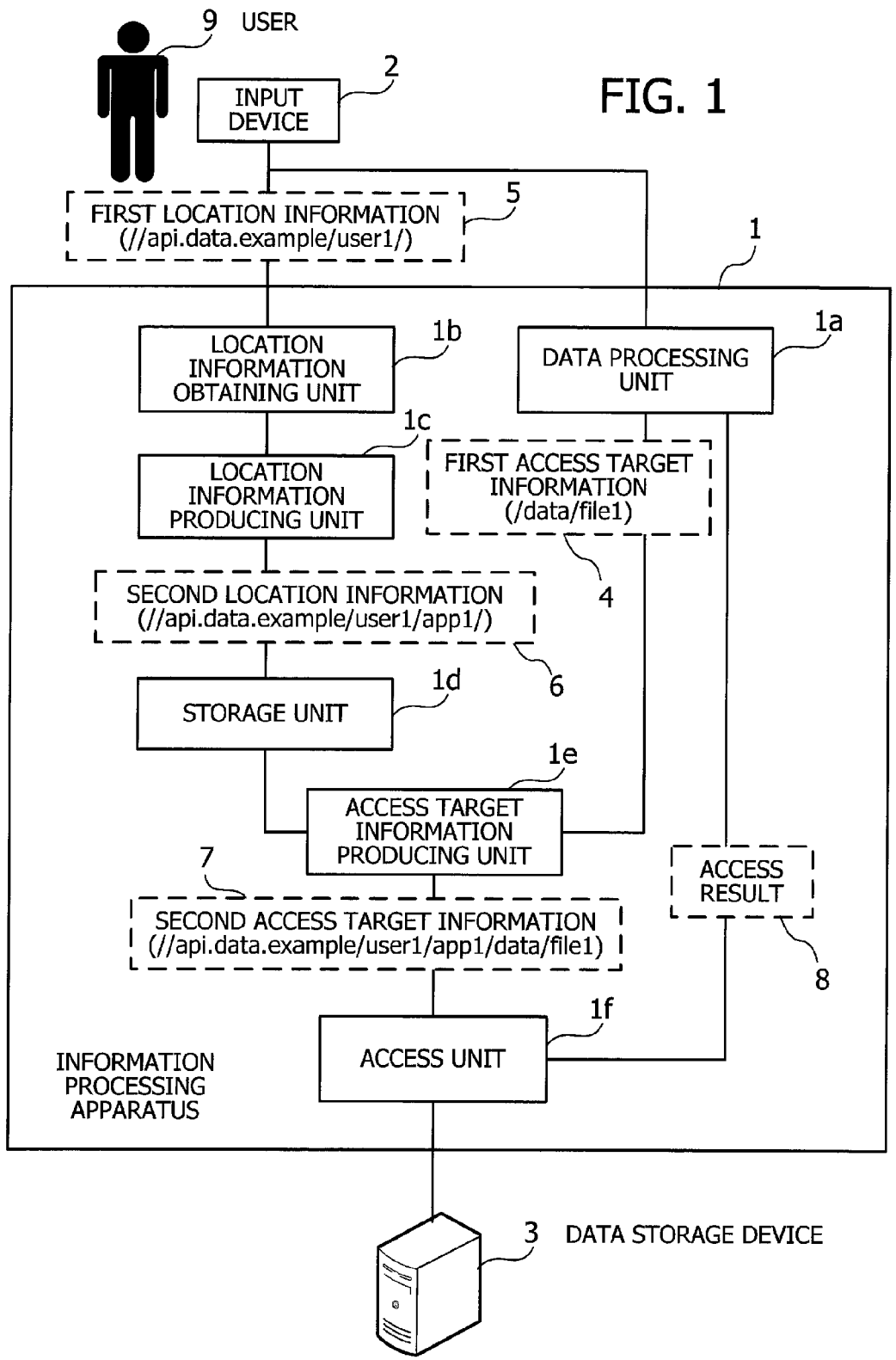
FIG. 1 illustrates an exemplary functional structure of an information processing apparatus according to a first embodiment.

FIG. 1 illustrates an exemplary functional structure of an information processing apparatus according to the first embodiment. The illustrated information processing apparatus 1 includes a data processing unit 1a, a location information obtaining unit 1b, a location information producing unit 1c, a storage unit 1d, an access target information producing unit 1e, and an access unit 1f. This information processing apparatus 1 handles, for example, first access target information 4, first location information 5, second location information 6, second access target information 7, and access result 8. These pieces of information are only an example of what is processed by the information processing apparatus 1. FIG. 1 uses broken-line boxes to represent such information, as opposed to processing unit in the information processing apparatus 1.

The data processing unit 1a performs data processing operations requested by the user 9. For example, the user 9 may enter a data processing request to the data processing unit 1a through an input device 2. The data processing unit 1a may also make access to personal data of the user 9. To this end, the data processing unit 1a produces first access target information 4 that indicates a path and name of a target data file containing the personal data, where the path points to the target data file by following the directory structure from a specific reference location.

It is noted here that the term "file" used in this description does not only refer to an individual data file in a file system. Rather, the term "file" may broadly refer to a data resource, or a single segment of storage areas for writing or reading data, such as a row of data in a database system.

It is also noted that the terms "directory" and "directory structure" used in this description does not only refer to a location of files in the file system of a single computer. Rather, the terms "directory" and "directory structure" broadly refer to information representing a hierarchical arrangement and reference structure of files, as in the Uniform Resource Locator (URL), or the identifier indicating the global location of a file in a multiple-computer environment.

The location information obtaining unit 1b obtains first location information 5 indicating an identifier of a data storage device 3 specified by the user and the location, within the data storage device 3, of a user-specified directory specified by the user. For example, the location information obtaining unit 1b receives first location information 5 that the user 9 enters through the input device 2.

Based on the first location information 5, the location information producing unit 1c produces second location information 6 indicating the location of a directory that is placed below the user-specified directory and uniquely assigned to the data processing unit 1a. For example, the location information producing unit 1c gives a unique name to the data processing unit 1a and appends the produced unique name to the first location information 5. Here the unique name serves as the directory name of a directory placed below the user-specified directory. By appending the unique name of the data processing unit 1a to the first location information 5, the location information producing unit 1c produces second location information 6. The location information producing unit 1c enters this second location information 6 in the storage unit 1d, for example.

The storage unit 1d stores the second location information 6.

The access target information producing unit 1e produces second access target information 7, based on the first access target information 4 and second location information 6. Here the location indicated by the second location information 6 is used as the reference location mentioned above. The second access target information 7 indicates the storage location and name of the target data file. For example, the access target information producing unit 1e retrieves the second location information 6 from the storage unit 1d and then appends the first access target information 4 to the retrieved second location information 6, thereby producing second access target information 7. The access target information producing unit 1e passes the produced second access target information 7 to the access unit 1f.

Based on the second access target information 7, the access unit 1f makes access to the target data file in the data storage device 3 and passes its access result 8 back to the data processing unit 1a. For example, what the data processing unit 1a is doing to the personal data may be a data write operation or a data read operation. In the case of a data write operation, the access unit 1f executes it by writing new data to the target data file in the data storage device 3 and returns a write completion notice to the data processing unit 1a as an access result 8. In the case of a data read operation, the access unit 1f executes it by reading data from the target data file in the data storage device 3 and passes the read data to the data processing unit 1a as an access result 8.

Figure 2:
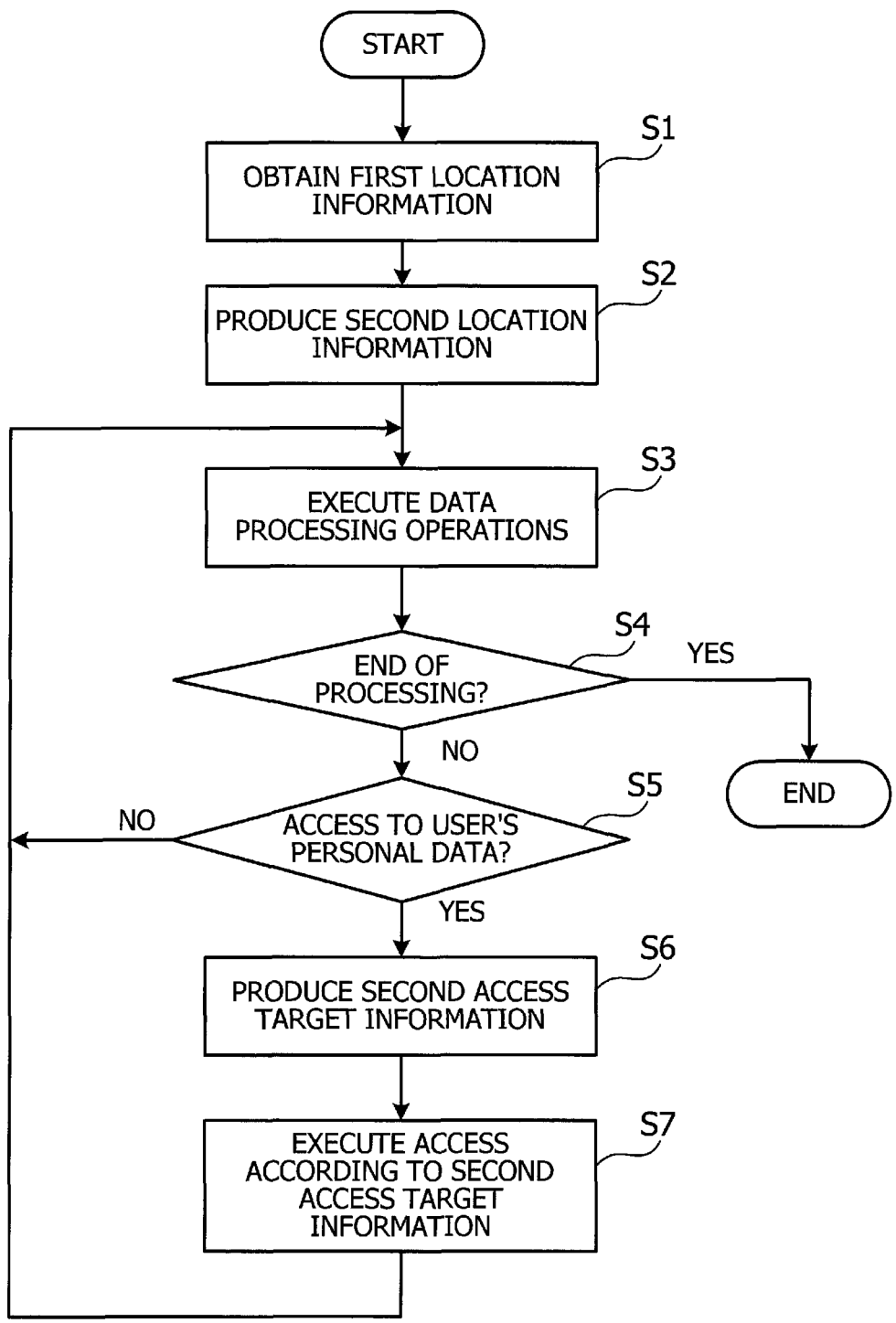
FIG. 2 is a flowchart illustrating operation of the information processing apparatus according to the first embodiment.

FIG. 2 is a flowchart illustrating operation of the information processing apparatus according to the first embodiment. Each step in FIG. 2 is described below in the order of step numbers.

(Step S1) It is supposed that the user has specified a data storage device 3 and a particular directory in the data storage device 3. The location information obtaining unit 1b obtains first location information 5 that indicates the identifier of the user-specified data storage device 3 and the location of the user-specified directory. In the example of FIG. 1, the location information obtaining unit 1b obtains "//api.data.example/user1/" as the first location information 5. This first location information 5 is formed from "api.data.example" and "/user1/", the former part being the identifier of the user-specified data storage device 3 and the latter part being the location of the user-specified directory.

(Step S2) Based on the first location information 5, the location information producing unit 1c produces second location information 6 that indicates the location of a directory placed below the user-specified directory. This directory is uniquely assigned to the data processing unit 1a. In the foregoing example of FIG. 1, the second location information 6 reads "//api.data.example/user1/app1/". This second location information 6 has been produced by appending a directory name "app1/" to the first location information 5 obtained above.

(Step S3) The data processing unit 1a executes data processing operations requested by the user 9.

(Step S4) The data processing unit 1a determines whether the data processing operations requested by the user 9 have been finished. For example, the end of data processing operations may be indicated explicitly by the requesting user 9. The data processing unit 1a may also recognize the end of data processing operations when all scheduled operations are finished. This is applied to a class of data processing that can be executed without the need for interaction with the user 9. The process of FIG. 2 is terminated when the requested data processing operations are found to be done. When the requested operations are still under way, the data processing unit 1a advances the process to step S5.

(Step S5) The data processing unit 1a determines whether there is a need for access to personal data of the user 9. When there is such a need for access, the data processing unit 1a produces first access target information 4 that indicates a path and name of a target data file containing desired personal data, so that the file is reached by following the directory structure from a specific reference location. The produced first access target information 4 reads "/data/file1" in the example of FIG. 1, which indicates that the access is directed to a target data file named "file1" in a directory named "/data". The process of FIG. 2 then proceeds to step S6. When there is no need for access to the user's personal data, the data processing unit 1a goes back to step S3.

(Step S6) The access target information producing unit 1e produces second access target information 7 based on the first access target information 4 and second location information 6. For example, the access target information producing unit 1e appends the first access target information 4 to the second location information 6, thereby producing second access target information 7. Referring again to the example of FIG. 1, the resulting second access target information 7 reads "//api.data.example/user1/app1/data/file1".

(Step S7) Based on the second access target information 7 produced above, the access unit 1f makes access to the target data file in the data storage device 3 and passes its access result 8 back to the data processing unit 1a. The access unit 1f goes back to step S3.

The above-described steps permit the information processing apparatus 1 to make access to personal data of the user 9 which resides in a directory that is located below the directory specified by the first location information 5 and uniquely associated with the data processing unit 1a. The user 9 may use a plurality of data processing unit by entering the same first location information 5 to them. The personal data of the user 9 in the data storage device 3 is managed separately in different directories uniquely associated with different data processing unit, so that those data processing unit refer to their respective sets of personal data.

For example, the user 9 may use a plurality of applications provided by many servers on the network. Each of those applications acts as the data processing unit 1a discussed in FIG. 1, which uses personal data of the user 9 managed in the data storage device 3.

The above features enable the user 9 to handle his or her own personal data easily because the data is consolidated and managed in a single data storage device 3.

The above-described data processing unit 1a, location information obtaining unit 1b, location information producing unit 1c, access target information producing unit 1e, and access unit 1f may be implemented as functions performed by a central processing unit (CPU) in the information processing apparatus 1. The storage unit 1d, on the other hand, may be implemented as a data storage medium such as random access memory (RAM) or hard disk drive (HDD) in the information processing apparatus 1.

The above-described first and second location information may take the form of URLs, for example. Accordingly, the following description uses the terms "user root URL" and "application-specific URL" to refer respectively to the first location information and second location information discussed in the first embodiment. The following description also uses the terms "application local path" and "access target URL" to denote the first access target information and second access target information, respectively.

For example, a single application may be provided to embody the data processing unit 1a, location information obtaining unit 1b, location information producing unit 1c, storage unit 1d, access target information producing unit 1e, and access unit 1f in the information processing apparatus 1 of FIG. 1. This application may be executed in, for example, one of the following three modes.

<First Application Execution Mode>

In the first application execution mode, a terminal device downloads an appropriate program from a server to a terminal device each time a need arises for some functions of a particular application. The terminal device executes the application with the downloaded program.

<Second Application Execution Mode>

In the second application execution mode, applications are executed on servers. For example, a server sends drawing commands (e.g., commands for displaying a HyperText Markup Language (HTML) document) to browser software running on a terminal device, so that a page is displayed on the terminal screen. The user may do some operations on the displayed screen, which causes the browser to transmit a HyperText Transfer Protocol (HTTP) request to the server. The application running on the server executes data processing operations in response to the HTTP request from the terminal device and transmits drawing commands back to the terminal device to display the execution result.

<Third Application Execution Mode>

In the third application execution mode, applications are previously installed in terminal devices. The user sets up an application program in a storage medium of his or her terminal device, so that the application is ready to run. For example, the user interacts with the terminal device to install an application in an executable state.

Applications are executed in one of the above three execution modes. Such applications may obtain a user root URL by using one of the following four methods.

<First Method for Obtaining User Root URLs>

The first method provides a display screen to prompt the user to enter his or her user root URL and obtains a URL entered through the screen.

<Second Method for Obtaining User Root URLs>

The second method permits the user to enter his or her user root URL at a convenient time, and stores the entered URL in an appropriate storage space for future reference by the applications. This method actually use the above first method to obtain a user root URL for the first time. The obtained user root URL is then stored in an appropriate storage space.

<Third Method for Obtaining User Root URLs>

The third method obtains a user root URL from a server simultaneously with downloading of an application program. For example, a server prepares endpoint URLs corresponding to individual users, so that the users receive a document personalized for them when they make access to their corresponding endpoint URLs. The endpoint URL prepared for a user by the server may also be accessed from the terminal device of the user when he or she wishes to use an application on the server. In response, the server sends a relevant application program back to the requesting terminal device, together with a user root URL that is previously associated with the endpoint URL.

<Fourth Method for Obtaining User Root URLs>

The fourth method utilizes OpenID, an identifier for authentication applicable to multiple websites, to obtain user root URLs. A single OpenID enables its owner to be authenticated at a plurality of websites. For one example of the fourth method, a website managing OpenID notifies an application of a user root URL. An OpenID may include information on the user root URL of a user, and the user logs in to an application by using such an OpenID. The application obtains the user root URL from the log-in OpenID that the user has used.

An application-specific URL is determined by obtaining a path (directory names etc) that uniquely identifies an application under a given user root URL. This operation may be achieved with, for example, one of the following three methods.

<First Method for Determining Application-Specific URL>

The first method determines an access target URL according to a rule base. For example, a rule base is defined as a set of rules for generating directory names that uniquely identify each different application. The application produces an application-specific URL for a specific application by appending such directory names of the application to the given user root URL in accordance with the rule base.

<Second Method for Determining Application-Specific URL>

The second method relies on an application-specific URL list prepared in a server corresponding to a user root URL. This application-specific URL list is a collection of application-specific URLs associated with the identifiers of applications. When a specific user root URL is given, its corresponding server provides an application-specific URL list to the application. The application then obtains its own application-specific URL from the application-specific URL list. Such application-specific URL lists may be access-restricted. For example, the server may request transmission of an authentication token from applications each time they try to use the server's application-specific URL list. Authentication tokens may comply with, for example, the OAuth protocol, which transfers authentication of Application Programming Interface (API) access. The server performs user authentication based on the received authentication token.

<Third Method for Determining Application-Specific URL>

The third method involves querying from an application to a server corresponding the given user root URL, as to an application-specific URL relevant to the application. The third method may also use the aforementioned authentication tokens or the like for a server to restrict queries about application-specific URLs.

The above-described three application execution modes, four methods for obtaining user root URLs, and three methods for determining application-specific URLs may be combined in various ways. It is therefore possible to provide a variety of embodiments based on such combinations. The following sections will describe in detail some of those possible embodiments.

[Second Embodiment]

This section describes a second embodiment. The second embodiment implements a combination of the foregoing first application execution mode, third method for obtaining user root URLs, and second method for determining application-specific URLs.

Figure 3:
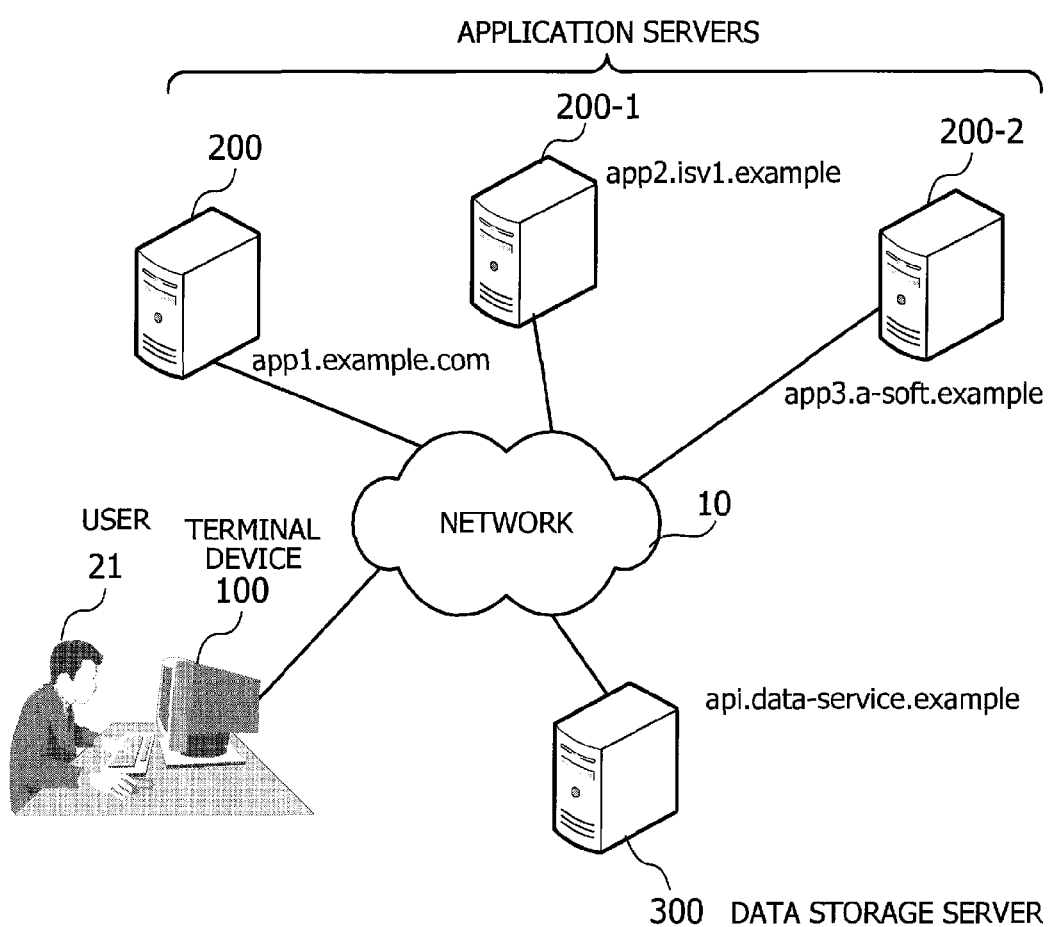
FIG. 3 illustrates an exemplary system configuration according to a second embodiment.

FIG. 3 illustrates an exemplary system configuration according to the second embodiment. The illustrated network 10 interconnects a terminal device 100, a plurality of application servers 200, 200-1, and 200-2, and a data storage server 300. The terminal device 100 is a computer through which a user 21 interacts with the system.

The application servers 200, 200-1, and 200-2 are computers configured to offer services with their own applications. Using his or her terminal device 100, the user 21 makes access to one of those application servers 200, 200-1, and 200-2 to request and receive a desired service.

The data storage server 300 is a computer configured to store personal data of the user 21. Specifically, the data storage server 300 stores personal data of the user 21, which may be used by different applications that the application servers 200, 200-1, and 200-2 provide.

In the illustrated network 10, the application servers 200, 200-1, and 200-2 and data storage server 300 are distinguished from each other by their domain names. In the example of FIG. 3, the three application servers 200, 200-1, and 200-2 have domain names of "app1.example.com", "app2.isv1.example", and "app3.a-soft.example", respectively. The data storage server 300 has a domain name of "api.data-service.example".

The above devices on the network 10 communicate with each other according to, for example, the HTTP or the HTTP over Secure Socket Layer (HTTPS).

Figure 4:
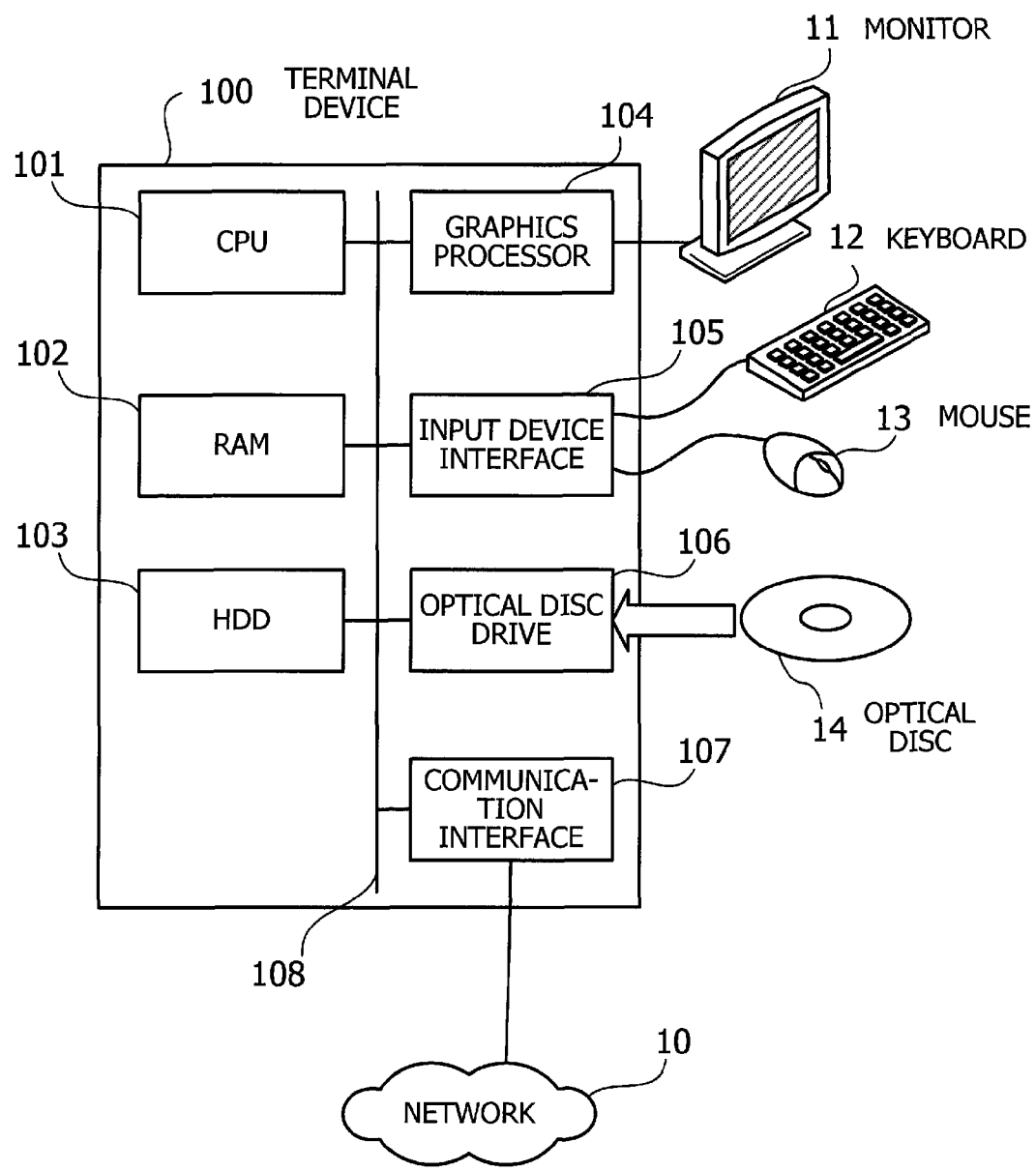
FIG. 4 illustrates an exemplary hardware configuration of a terminal device used in the second embodiment.

FIG. 4 illustrates an exemplary hardware configuration of a terminal device used in the second embodiment. The illustrated terminal device 100 has a CPU 101 to control the entire device. The CPU 101 is connected to a RAM 102 and other various devices and interfaces via a bus 108.

The RAM 102 serves as primary storage of the terminal device 100. Specifically, the RAM 102 is used to temporarily store at least some of the operating system (OS) programs and application programs that the CPU 101 executes, in addition to other various data objects that the CPU 101 manipulates at runtime.

Other devices on the bus 108 are a hard disk drive (HDD) 103, a graphics processor 104, an input device interface 105, an optical disc drive 106, and a communication interface 107.

The HDD 103 writes and reads data magnetically on its internal platters. The HDD 103 serves as secondary storage of the terminal device 100 to store program and data files of the operating system and applications. Flash memory and other semiconductor memory devices may also serve as secondary storage.

The graphics processor 104, coupled to a monitor 11, produces video images in accordance with drawing commands from the CPU 101 and displays them on a screen of the monitor 11. The monitor 11 may be, for example, a cathode ray tube (CRT) display or a liquid crystal display.

The input device interface 105 is connected to input devices such as a keyboard 12 and a mouse 13 and supplies signals from those devices to the CPU 101. The mouse 13 is a pointing device, which may be replaced with other kinds of pointing devices such as touchscreen, tablet, touchpad, and trackball.

The optical disc drive 106 reads out data encoded on an optical disc 14, by using laser light. The optical disc 14 is a portable data storage medium, the data recorded on which can be read as a reflection of light. The optical disc 14 may be a digital versatile disc (DVD), DVD-RAM, compact disc read-only memory (CD-ROM), CD-Recordable (CD-R), or CD-Rewritable (CD-RW), for example.

The communication interface 107 is connected to a network 10 and exchanges data with other computers over the network 10.

The above-described hardware platform may be used to realize the processing functions of the embodiments discussed in this description. While FIG. 4 only depicts a terminal device 100 as an example of hardware configuration, the same hardware configuration may similarly be used to implement the application servers 200, 200-1, and 200-2 and data storage server 300, as well as the foregoing information processing apparatus 1 according to the first embodiment discussed in FIG. 1.

Figure 5:
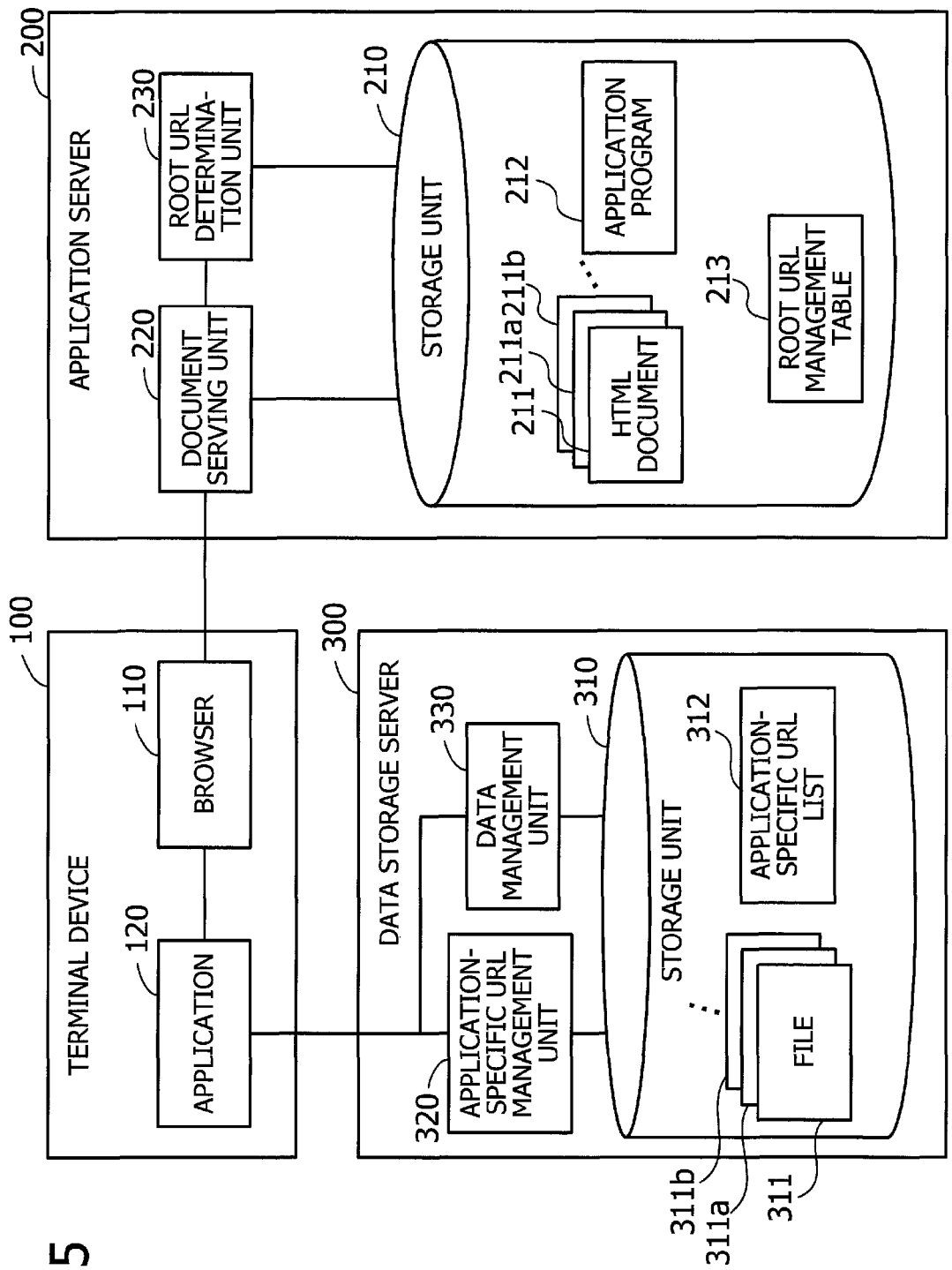
FIG. 5 is a block diagram illustrating functions of devices used in the second embodiment.

FIG. 5 is a block diagram illustrating functions of several devices used in the second embodiment. The illustrated terminal device 100 includes a browser 110 and an application 120. It is noted that the application 120 is loaded to the terminal device 100 each time a user 21 needs a data processing function of the application 120.

The browser 110 parses an HTML document and displays its content on a screen of the monitor 11. If a given structured document contains a script for execution of an application 120, the browser 110 downloads a relevant application program from the application server 200 and stores it in RAM 102 or HDD 103 of the terminal device 100. Here the browser 110 extracts a user root URL of the user 21 from the HTML document as it includes a script for execution of an application 120. The extracted user root URL points to a specific storage space in the data storage server 300 in which data of the user 21 is stored. The browser 110 includes this user root URL as a parameter of a start command when issuing it to launch the application 120.

The application 120 performs data processing operations requested by the user 21. When launched, the application 120 makes access to the data storage server 300 by using the above-noted parameter of the user root URL to obtain an application-specific URL list 312 for the user 21. This application-specific URL list 312 is a collection of application-specific URLs associated with various applications that the user 21 may use. The application 120 finds its own associated application-specific URL from the obtained application-specific URL list 312. The application 120 produces an access target URL when a need arises for access to personal data of the user 21 during the course of data processing. For example, the obtained application-specific URL points to a specific place in the directory structure, which the application 120 regards as the reference location. The application 120 produces an access target URL by appending additional location information to the application-specific URL, where the additional location information points to the location of intended data by following the directory structure from the reference location. The application 120 uses this access target URL to execute a data access to the data storage server 300.

The application server 200 includes a storage unit 210, a document serving unit 220, and a root URL determination unit 230.

The storage unit 210 contains a plurality of HTML documents 211, 211a, 211b, . . . , an application program 212, and a root URL management table 213. The application program 212 is a program code describing what data processing operations the application 120 is supposed to execute. The root URL management table 213 is a collection of user root URLs of different users.

The document serving unit 220 transmits an HTML document or an application program 212 to the terminal device 100 when so requested from the browser 110 in the terminal device 100. The document serving unit 220 has an endpoint URL associated with the user 21, and an authentication procedure may be implemented to grant access to this endpoint URL. When there is an access request from the browser 110 to the endpoint URL, the document serving unit 220 sends the terminal device 100 an HTML document 211 that is associated with the requesting user 21. This HTML document includes a script for execution of the application program 212. The document serving unit 220 obtains a user root URL of the user 21 from the root URL determination unit 230 and inserts the user root URL into the HTML document 211 to be transmitted. The document serving unit 220 may also transmit an application program 212 to the browser 110 in the terminal device 100 when the browser 110 requests it.

Upon request from the document serving unit 220, the root URL determination unit 230 consults the root URL management table 213 to find a user root URL of the user 21 who wishes to use the application program 212. The root URL determination unit 230 then informs the document serving unit 220 of the user root URL that is found.

The data storage server 300 includes a storage unit 310, an application-specific URL management unit 320, and a data management unit 330.

The storage unit 310 stores files 311, 311a, 311b, ... and an application-specific URL list 312. The files 311, 311a, 311b, ... contain personal data of the user 21. The application-specific URL list 312 is a collection of application-specific URLs each indicating the location of a data file used by a specific application. As the user 21 may use a plurality of applications, the application-specific URL list 312 includes a plurality of such application-specific URLs.

The application-specific URL management unit 320 sends an application-specific URL list 312 upon request from the application 120. For example, the application-specific URL management unit 320 may be configured to send an application-specific URL list 312 only if the user 21 of the application 120 is successfully authenticated in advance.

The data management unit 330 makes access to a specified file upon receipt of an access request from the application 120. In one case, the access request asks for retrieval of a specific file. The data management unit 330 thus reads and transmits the requested file to the application 120. Here the location of the requested file is specified by an access target URL. In another case, the access request specifies a file to be written. The data management unit 330 then writes the specified file to the specified location in the storage unit 310.

The following section goes into details of the structure of data stored in the above devices.

FIG. 6 illustrates an exemplary data structure of a root URL management table. The illustrated root URL management table 213 is formed from three data fields named user ID, endpoint URL, and user root URL.

The user ID field contains an identifier (user ID) for uniquely identifying each user of the application server 200.

The endpoint URL field is associated with a specific user ID to indicate the endpoint URL of a user identified by that user ID.

The user root URL field is also associated with a specific user ID to indicate the user root URL of a user identified by that user ID.

The root URL determination unit 230 determines the user root URL of a user in question by consulting this root URL management table 213. Suppose, for example, that the user 21 makes access to an endpoint URL corresponding to his or her user ID of "AB1234." In this case, the root URL determination unit 230 extracts a user root URL associated with the user ID AB1234 and informs the document serving unit 220 of the extracted user root URL as being relevant to the requesting user 21.

The exemplary endpoint URL seen in FIG. 6 is "http://app1.example/?userUrl=http%253A%252F%252Fdata.example%252Fshimono" for user ID "AB1234". This endpoint URL indicates that a document serving unit 220 identified by the URL "http://app1.example/" is supposed to receive a user root URL of "http://api.data.example/user1/" as the value of a parameter named "userUrl". When there is a request specifying the above endpoint URL, the document serving unit 220 returns a response including the received URL "http://api.data.example/user1" as a user root URL for configuration of the application 120.

The determination method executed by the root URL determination unit 230 involves a logic to produce a user root URL from a given endpoint URL. One possible logic is to use a table for looking up such URLs. Another possible logic is to produce a URL by parsing query parameters.

Although the above-described root URL determination unit 230 finds a user root URL by consulting a table with the endpoint URL corresponding to a user ID, the embodiment of the root URL determination unit 230 is not limited to that specific method. For example, another possible method is to produce a user root URL by manipulating character strings from the endpoint URL corresponding to a user ID. Yet another possible method is to determine a user root URL by consulting a table with a user ID submitted in the preceding user authentication.

Also, the above-described processing may use other tables than the one illustrated in FIG. 6. The exemplary table of FIG. 6 is formed from three associated data fields of user ID, endpoint URL, and user root URL. One variation of this table may only combine two of those data fields, e.g., user ID and user root URL, or endpoint URL and user root URL.

The above-described second embodiment uses a root URL management table 213 to manage user root URLs. Alternatively, it is also possible to embed a user root URL in HTML documents before they are provided to users. For example, a user root URL corresponding to an endpoint URL is previously written in the HTML document, so that the user root URL will be transmitted as part of the document in response to an access request to the endpoint URL. This implementation eliminates the need for the root URL determination unit 230 and root URL management table 213.

The storage unit 310 in the data storage server 300 stores data in the following directory structure.

Figure 7:
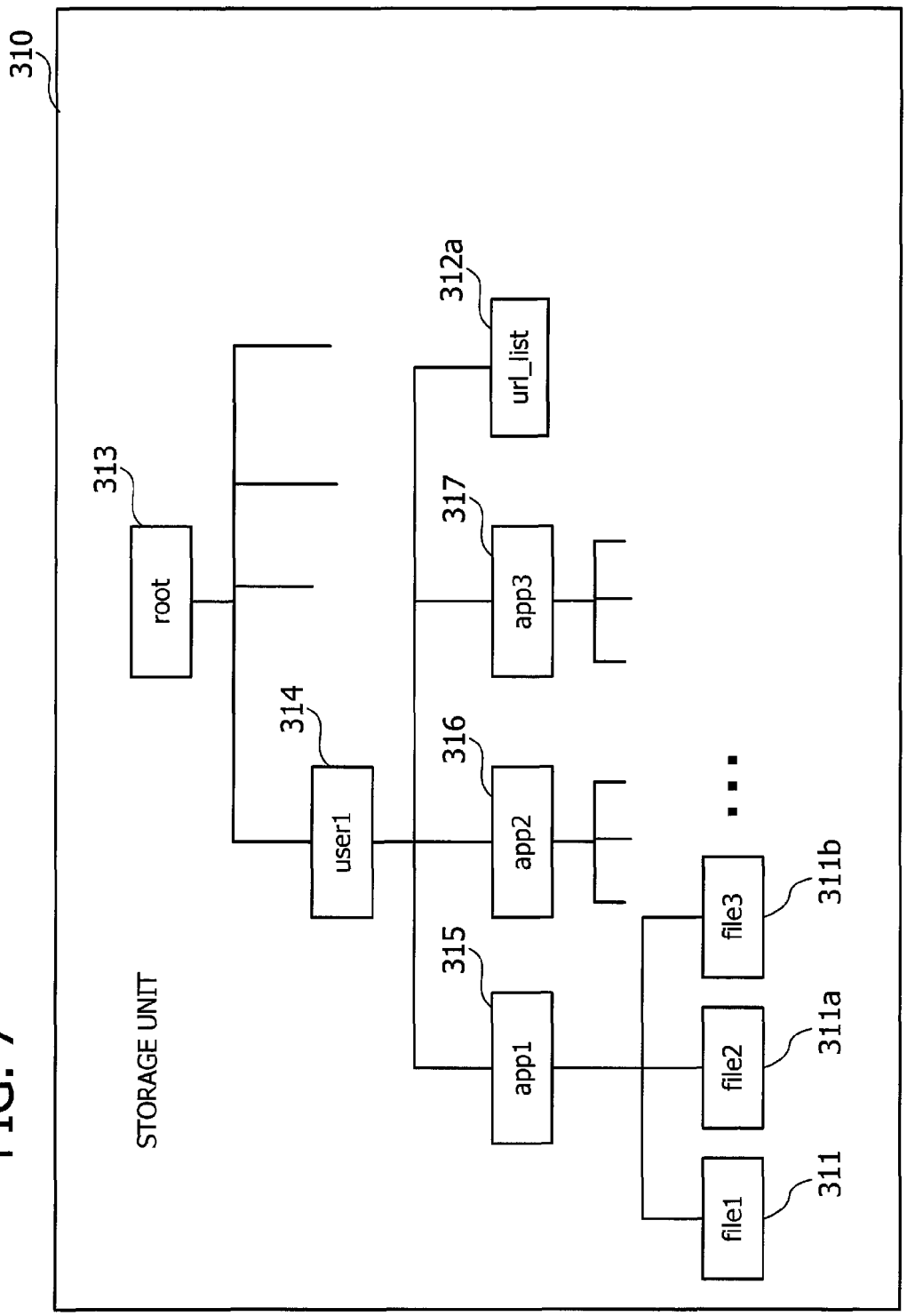
FIG. 7 illustrates an exemplary directory structure of a storage unit in a data storage server.

FIG. 7 illustrates an exemplary directory structure of a storage unit in a data storage server. The illustrated storage unit 310 stores the files in a hierarchical directory structure under the control of a file system supported by the OS of the data storage server 300. In the example of FIG. 7, a directory 314 named "user1" is located immediately below the topmost "root" directory 313. This "user1" directory 314 is provided for the purpose of storing personal data of a user 21.

Located below the "user1" directory 314 are a directory 315 named "app1," a directory 316 named "app2," and a directory 317 named "app3." The "app1" directory 315 is for storing personal data of the user 21 which the application 120 provided in one application server 200 may use. The "app2" directory 316 is for storing personal data of the user 21 which the application provided in another application server 200-1 may use. The "app3" directory 317 is for storing personal data of the user 21 which the application provided in yet another application server 200-2 may use.

A plurality of files 311, 311a, 311b, ... are stored in the "app1" directory 315. One file 311 is named "file1". Another file 311a is named "file2". Yet another file 311b is named "file3".

A file 312a named "url_list" is stored in the "user1" directory 314. This "url_list" file 312a contains an application-specific URL list 312.

The application-specific URL list has a data structure described below.

FIG. 8 illustrates an exemplary data structure of an application-specific URL list. The illustrated application-specific URL list 312 describes its content by using the Extensible Markup Language (XML). Specifically, the application-specific URL list 312 includes application-specific URLs corresponding to different applications, together with the domain names of application servers providing those applications.

For example, an application-specific URL "http://api.data-service.example/user1/app1/" is associated with a domain name "app1.example.com". Another application-specific URL "http://api.data-service.example/user1/app2/" is associated with another domain name "app2.isv1.example". Yet another application-specific URL "http://api.data-service.example/user1/app3/" is associated with yet another domain name "app3.a-soft.example".

The next section will describe in detail what functions are provided in the application 120.

FIG. 9 is a block diagram illustrating exemplary functions of an application. The illustrated application 120 includes a data processing unit 121, a user root URL obtaining unit 122, a user root URL storage unit 123, an application-specific URL determination unit 124, an application-specific URL storage unit 125, an access target URL generation unit 126, and an accessing unit 127.

The data processing unit 121, responsive to a start request from the browser 110, executes data processing operations according to commands or the like from a user 21. When the data processing operations use personal data of the user 21, the data processing unit 121 sends an access request to the access target URL generation unit 126, together with an application local path pointing to the personal data by following the directories from a specific reference location. More specifically, this application local path is a combination of a relative path of a personal data file with respect to the reference location in the directory structure and the name of the personal data file. The data processing unit 121 also receives the result of the access request from the accessing unit 127.

The user root URL obtaining unit 122 obtains location information from the browser 110. For example, the user root URL obtaining unit 122 obtains a user root URL specified as a parameter in the activation request from the browser 110 and enters the obtained user root URL in the user root URL storage unit 123.

The user root URL storage unit 123 stores the user root URL. For example, the user root URL storage unit 123 may be implemented as part of storage space of the RAM 102 or HDD 103.

The application-specific URL determination unit 124 determines an application-specific URL based on the user root URL stored in the user root URL storage unit 123. For example, the application-specific URL determination unit 124 makes access to the data storage server 300 to request a file named "url_list", residing immediately below the user root URL. In response to this file request, the data storage server 300 returns an application-specific URL list 312. The application-specific URL determination unit 124 determines its application-specific URL by consulting this application-specific URL list 312. Suppose that, for example, that the application-specific URL determination unit 124 is previously informed of a specific domain name that indicates the application server 200 providing the application 120. In this case, the application-specific URL determination unit 124 selects an application-specific URL associated with the given domain name as being relevant to the application 120 itself. The application-specific URL determination unit 124 stores the selected application-specific URL in the application-specific URL storage unit 125.

The application-specific URL storage unit 125 holds the application-specific URL. For example, the application-specific URL storage unit 125 may be implemented as part of storage space of the RAM 102 or HDD 103.

The access target URL generation unit 126 produces an access target URL based on the application-specific URL stored in the application-specific URL storage unit 125 and the foregoing application local path in the access request from the data processing unit 121. The access target URL generation unit 126 passes the produced access target URL to the accessing unit 127.

The accessing unit 127 makes access to the access target URL over the network 10. The access target URL produced by the application 120 actually points to a particular file in the data storage server 300. The accessing unit 127 thus submits an access request to the data storage server 300 and receives a response indicating the result from the data storage server 300, depending on the type of access request. In the case of a data read request, the response contains data read out of the access target. In the case of a data write request, the response indicates the result of the requested write operation.

The above-described functions of devices enable the data storage server 300 to manage personal data of the user 21 in a consolidated way, while the data may be used by a plurality of applications provided by applications servers 200, 200-1, and 200-2. The next section will describe a procedure up to a data access, assuming that the application 120 provided by the application server 200 uses data in the data storage server 300.

FIG. 10 is a sequence diagram illustrating a procedure executed in the second embodiment. Each operation in FIG. 10 is described below in the order of step numbers.

(Step S11) The user 21 enters an application start command to the browser 110 in his or her terminal device 100, specifying a URL associated with himself or herself. For example, the user 21 selects a shortcut icon associated with a particular URL by using a pointing device, thus entering an application start command.

(Step S12) The browser 110 transmits a GET request specifying the entered URL to the application server 200.

(Step S13) Upon receipt of the GET request, the document serving unit 220 in the application server 200 retrieves an HTML document from the specified location in the storage unit 210. The document serving unit 220 submits a user root URL determination request to the root URL determination unit 230.

(Step S14) In response to the user root URL determination request, the root URL determination unit 230 determines what user root URL corresponds to the user 21. Suppose, for example, that the user 21 has been authenticated with his or her user ID of "AB1234" and has issued an application start command specifying an endpoint URL corresponding to that user ID. In this case, the root URL determination unit 230 consults the root URL management table 213 to extract therefrom a user root URL associated with the user ID "AB1234", thus determining what user root URL corresponds to the user 21.

(Step S15) The root URL determination unit 230 sends the determined user root URL to the document serving unit 220 as its response.

(Step S16) The document serving unit 220 sends an HTML document containing the received user root URL to the terminal device 100 as its response.

(Step S17) The browser 110 in the terminal device 100 evaluates the HTML document received from the application server 200. That is, the browser 110 analyzes what is written in the HTML document and detects, for example, a tag that indicates an embedded object.

(Step S18) When the object embedding tag detected in the HTML document specifies an application program 212, the browser 110 sends a request to the application server 200 to get that application program 212.

(Step S19) In the application server 200, the document serving unit 220 retrieves the application program 212 from its storage unit 210 and sends the retrieved application program 212 back to the terminal device 100 as its response.

(Step S20) Upon receipt of the application program 212 from the application server 200, the browser 110 in the terminal device 100 stores the application program 212 in its local RAM 102, for example. The browser 110 then sends the OS an execution command for the application program 212 with a parameter specifying the user root URL, thus launching an application 120.

(Step S21) The launched application 120 issues a query for application-specific URL list to the data storage server 300, specifying the user root URL.

(Step S22) In response to the query from the terminal device 100, the application-specific URL management unit 320 in the data storage server 300 returns an application-specific URL list 312 to the terminal device 100.

(Step S23) In the terminal device 100, the application 120 searches the received application-specific URL list 312 to find out which application-specific URL is relevant to the application 120 itself. The application 120 then stores its own application-specific URL in the application-specific URL storage unit 125.

(Step S24) The application 120 sends data for an initial screen to the browser 110. The browser 110 displays the HTML document received at step S16 on the monitor 11, embedding an initial screen of the application 120 (see FIG. 12) in the resulting view.

(Step S25) Viewing the screen on the monitor 11, the user 21 operates his or her keyboard 12 and mouse 13 to enter a command for the application 120 to execute data processing operations.

(Step S26) The application 120 executes data processing operations requested by the user 21. To use personal data of the user 21, the application 120 produces an access target URL of the personal data by appending its application local path to the application-specific URL.

(Step S27) The application 120 makes access to the data storage server 300, specifying the produced access target URL.

(Step S28) In the data storage server 300, the data management unit 330 executes access to the specified access target URL and returns its result to the terminal device 100.

(Step S29) The application 120 in the terminal device 100 continues the data processing operations according to the access result received from the data storage server 300. The application 120 then sends data indicating the result of data processing operations back to the browser 110. The browser 110 produces a screen on the monitor 11 to display what the application has done (see FIG. 13).

The above steps permit the application 120 to execute data processing operations using personal data of the requesting user 21 which is stored in the data storage server 300. It is noted that the application 120 obtains a user root URL from the HTML document supplied from the application server 200.

FIG. 11 illustrates an example of an HTML document including a user root URL. The illustrated HTML document 30 includes an <object> tag 31 to embed an image representing an application 120. The HTML document 30 also contains a <param> tag 32 that includes a user root URL as its "value" attribute.

This HTML document 30 causes the browser 110 to obtain an application program 212 from the application server 200 according to what is designated in the "data" attribute in the <object> tag 31. With the obtained application program 212, the browser 110 starts execution of an application 120, specifying the user root URL in the "value" attribute of a <param> tag 32 as a parameter for the execution.

Upon startup of the application 120, the terminal device 100 outputs an initial screen of the application 120 on the monitor 11.

FIG. 12 illustrates an example of an initial screen produced by an application. The example seen in FIG. 12 is an initial screen of a scheduler application. This initial screen 40 gives a list of months for which the application 120 has schedule data to display. The user 21 may select one of those months, and the application 120 displays scheduled events of the user 21 in the selected month.

To display schedules in a specified month, the application 120 has to retrieve relevant personal data of the user 21. To this end, the application 120 produces an access target URL by appending an application local path to the application-specific URL and sends a request to the access target URL to get desired data.

In response, the data storage server 300 sends the terminal device 100 a file describing a single-month schedule of the user 21. The application 120 then takes schedule data out of the file received from the data storage server 300 and displays it on a monitor screen.

Figure 13:
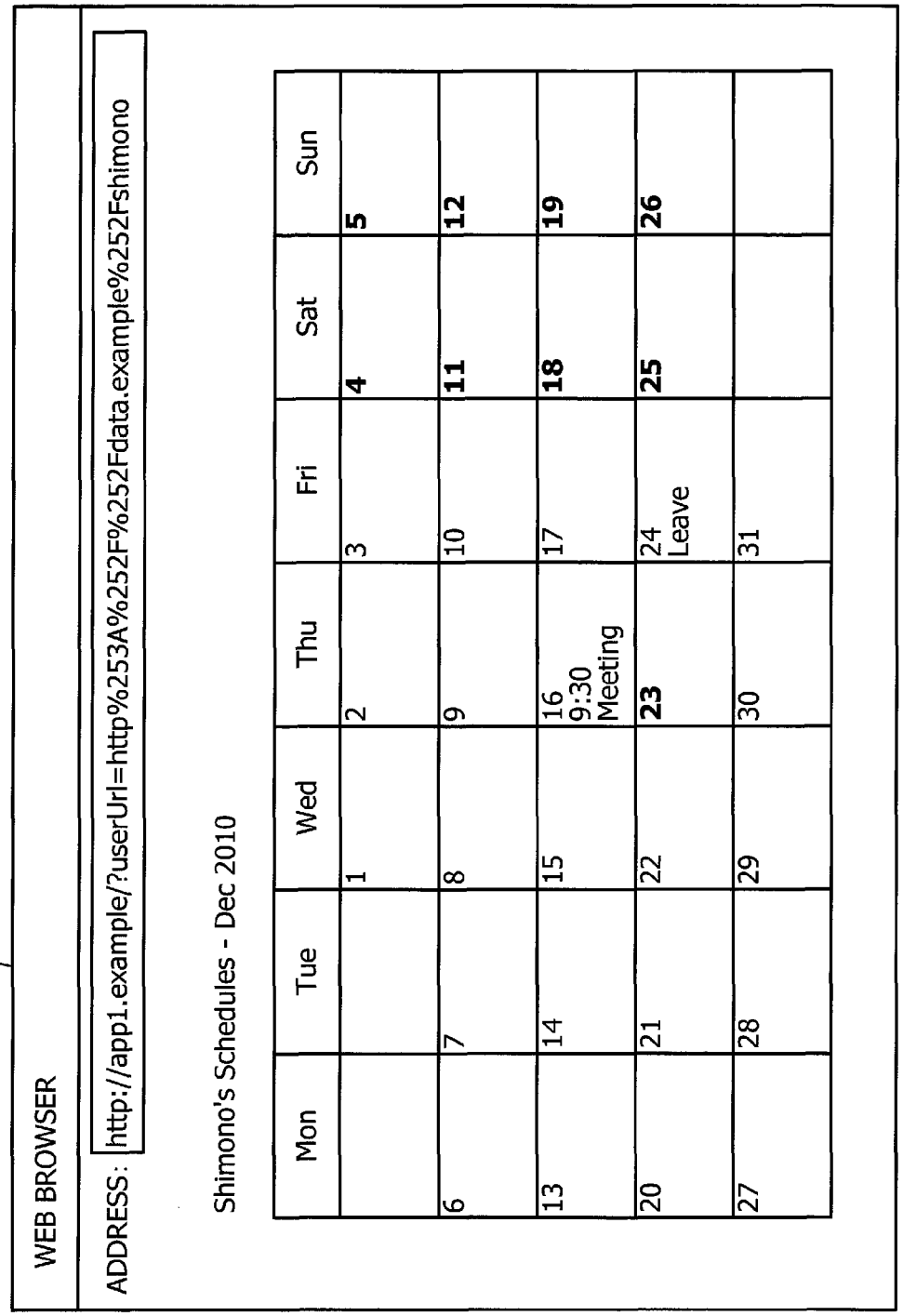
FIG. 13 illustrates an example of a schedule screen.

FIG. 13 illustrates an example of a schedule screen. This schedule screen 41 represents schedules of the user 21 in a specified month (December 2010 in the example of FIG. 13).

As can be seen from the above example, the application 120 provided by the application server 200 obtains personal data of the user 21 from the data storage server 300. The same applies to other applications provided by other application servers 200-1 and 200-2. In other words, the personal data of the user 21 can be managed only in one data storage server 300.

[Third Embodiment]

This section describes a third embodiment. The third embodiment implements a combination of the foregoing first application execution mode, third method for obtaining user root URLs, and third method for determining application-specific URLs. The third embodiment assumes the same system configuration illustrated in FIG. 3 for the second embodiment. While the third embodiment uses the same components of each device discussed in FIGS. 5 and 9 for the second embodiment, at least some of those components operate differently from the second embodiment. The following description is directed to such dissimilar features of the third embodiment while using same reference numerals of the components seen in FIG. 5.

Figure 14:
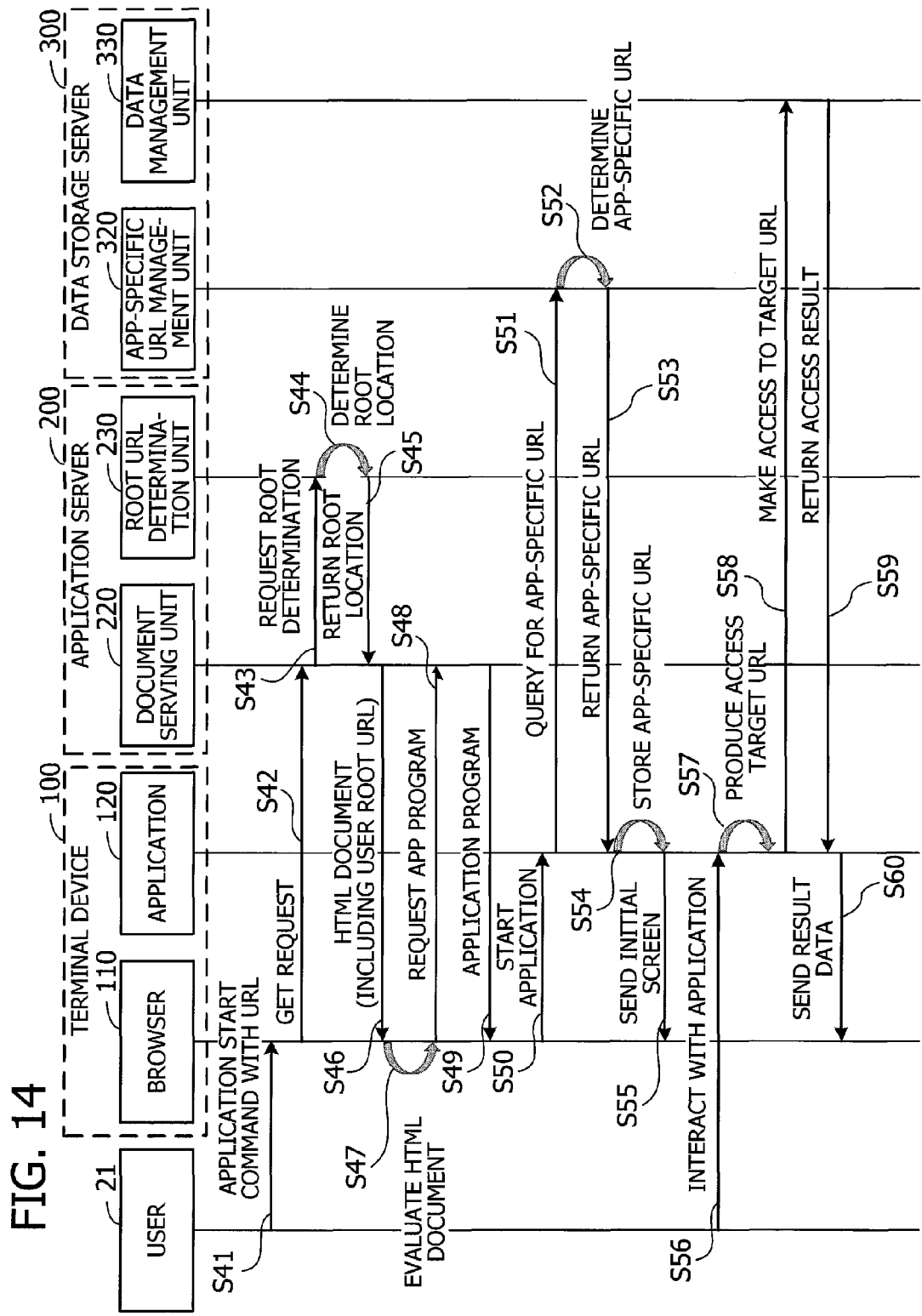
FIG. 14 is a sequence diagram illustrating an exemplary procedure executed in a third embodiment.

FIG. 14 is a sequence diagram illustrating an exemplary procedure executed in the third embodiment. In this sequence, steps S41 to S50 and S54 to S60 are similar to steps S11 to S20 and S23 to S29 of FIG. 10 discussed in the second embodiment, whereas steps S51 to S54 are different from the second embodiment. The following description explains these different steps in the order of step numbers.

(Step S51) The started application 120 issues a query for an application-specific URL to the data storage server 300, specifying the user root URL and the identifier of the application 120 itself. The application identifier may be, for example, a character string (e.g., http://app1.example.com/) that contains the domain name of the application server 200 hosting the application 120.

(Step S52) In response to the query from the terminal device 100, the application-specific URL management unit 320 in the data storage server 300 determines an application-specific URL. For example, the application-specific URL management unit 320 consults the application-specific URL list 312 for the user 21 to find an application-specific URL corresponding the identifier of the application 120 that is specified in the query.

(Step S53) The application-specific URL management unit 320 sends the found application-specific URL to the terminal device 100 as its response.

(Step S54) In the terminal device 100, the application 120 stores the received application-specific URL in the application-specific URL storage unit 125.

The above steps of the third embodiment enable the data storage server 300 to determine which application-specific URL corresponds to the application 120. According to the foregoing second embodiment, the data storage server 300 returns a whole list of application-specific URLs to the terminal device 100. In contrast, the data storage server 300 in the third embodiment only returns a part of the list, i.e., a single application-specific URL that is found to be relevant, thus reducing the amount of communication data.

[Fourth Embodiment]

This section describes a fourth embodiment. The fourth embodiment implements a combination of the foregoing first application execution mode, third method for obtaining user root URLs, and first method for determining application-specific URLs. The fourth embodiment assumes the same system configuration illustrated in FIG. 3 for the second embodiment. While the fourth embodiment uses the same components of the terminal device and application servers discussed in FIGS. 5 and 9 for the second embodiment, at least some of those components of the fourth embodiment operate differently from the second embodiment.

Another difference is that the fourth embodiment includes no application-specific URL management unit in its data storage server, whereas the storage unit and data management unit remain as in the second embodiment. The data storage server stores in its storage unit a plurality of files, including a personal data file of the user 21. The fourth embodiment, however, does not include application-specific URL lists.

As can be seen from the above, the components of the fourth embodiment are a subset of those discussed in FIG. 5 for the second embodiment. The following description is directed to unlike features of the fourth embodiment while using same reference numerals of the components seen in FIG. 5.

Figure 15:
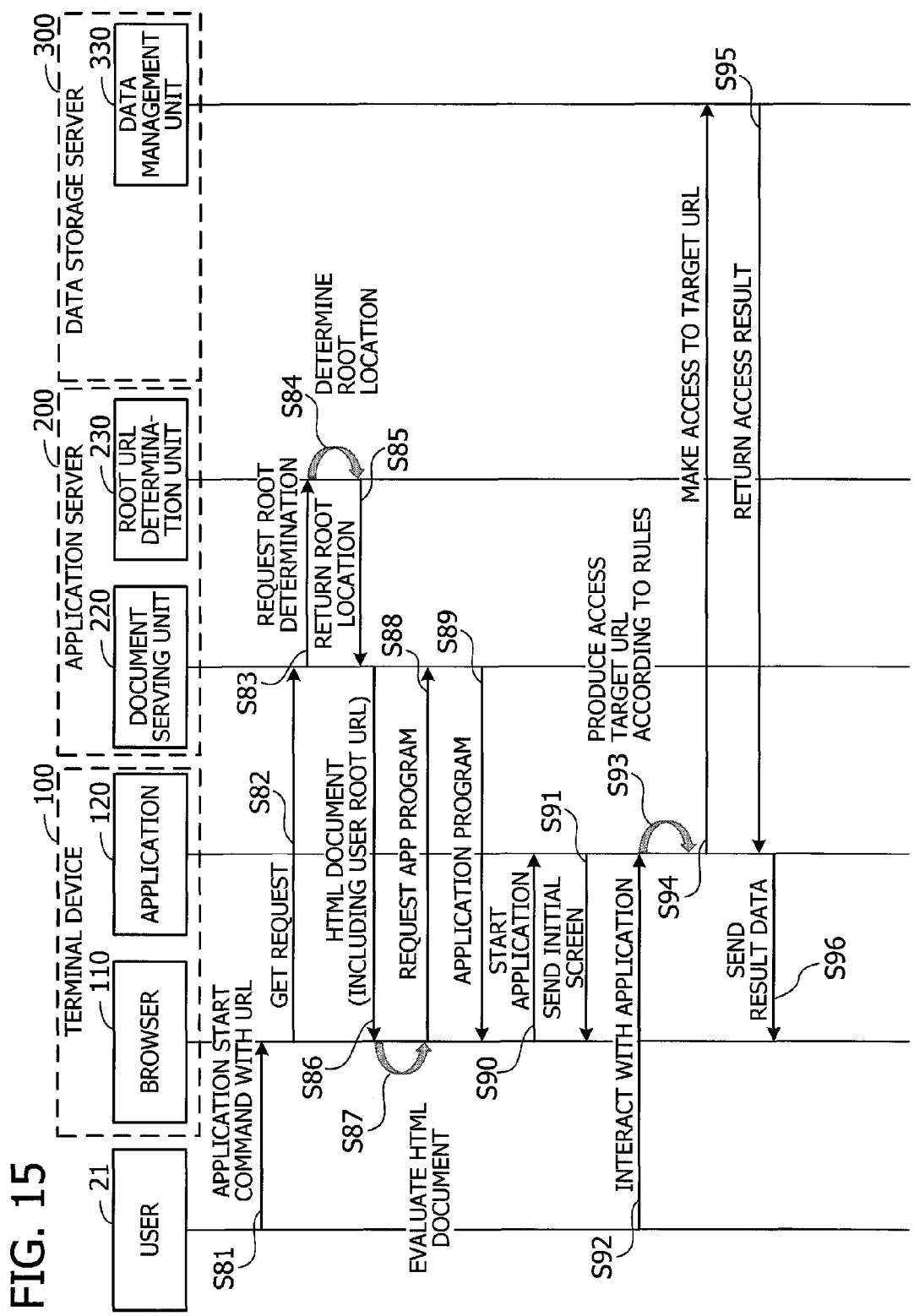
FIG. 15 is a sequence diagram illustrating an exemplary procedure executed in a fourth embodiment.

FIG. 15 is a sequence diagram illustrating an exemplary procedure executed in the fourth embodiment. In this sequence, steps S81 to S90 and S94 to S96 are similar to steps S11 to S20 and S27 to S29 of FIG. 10 discussed in the second embodiment, whereas steps S91 to S93 are different from the second embodiment. The following description explains these different steps in the order of step numbers.

(Step S91) The started application 120 sends data of an initial screen to the browser 110, without issuing queries for an application-specific URL list to the data storage server 300. The browser 110 displays the HTML document received at step S86 on the monitor 11 after embedding an initial screen of the application 120.

(Step S92) Viewing the screen on the monitor 11, the user 21 operates his or her keyboard 12 and mouse 13 to enter a command for the application 120 to execute data processing operations.

(Step S93) The application 120 produces an access target URL according to a rule base. For this purpose, the application 120 is configured with a predefined set of rules for generation of access target URLs. For example, the rules may define a procedure that produces first a unique character string identifying an application 120, forms a path that includes the produced character string as a directory name, and appends the path to the given user root URL. The unique character string for an application 120 may include, for example, the domain name of the application server 200 hosting the application 120.

As can be seen from the above, the fourth embodiment uses a rule base to determine application-specific URLs, thus eliminating the need for configuring the data storage server 300 to manage application-specific URLs. The fourth embodiment also eliminates query-and-response interactions about application-specific URL list between the terminal device 100 and data storage server 300 before launching an application 120, thus reducing the burden of communication.

[Fifth Embodiment]

This section describes a fifth embodiment. The fifth embodiment implements a combination of the foregoing first application execution mode, fourth method for obtaining user root URLs, and second method for determining application-specific URLs.

Figure 16:
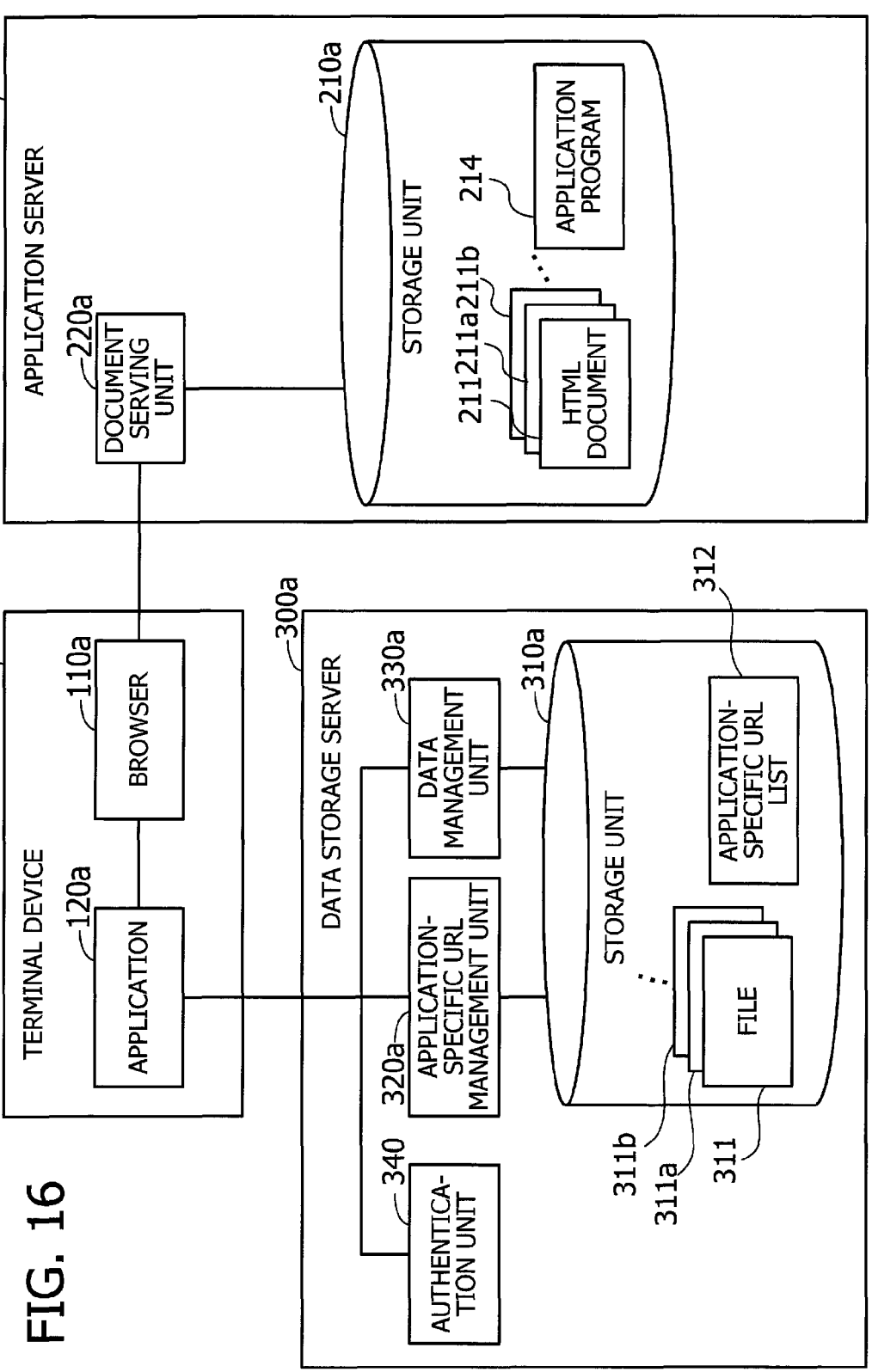
FIG. 16 is a block diagram illustrating exemplary functions of devices used in the fifth embodiment.

FIG. 16 is a block diagram illustrating exemplary functions of devices used in the fifth embodiment. The illustrated terminal device 100a includes a browser 110a and an application 120a that function in the same way as their respective counterparts in the terminal device 100 discussed in FIG. 5 for the second embodiment. Also, the application 120a has the function of negotiating with a data storage server 300a on the basis of OpenID for the right of execution of applications.

The illustrated application server 200a includes a storage unit 210a and a document serving unit 220a. The storage unit 210a stores a plurality of HTML documents 211, 211a, 211b, . . . and an application program 214 describing what the application 120a is supposed to execute. The document serving unit 220a transmits an HTML document and the application program 214 upon request from the terminal device 100a.

The illustrated data storage server 300a includes a storage unit 310a, an application-specific URL management unit 320a, a data management unit 330a, and an authentication unit 340. The storage unit 310a, application-specific URL management unit 320a, and data management unit 330a function in the same way as their respective counterparts in the data storage server 300 discussed in FIG. 5 for the second embodiment.

The authentication unit 340 provides a user authentication mechanism based on the OpenID standard. The authentication unit 340 authenticates a user based on, for example, a combination of ID and password received as a credential of the user. The authentication unit 340 returns an affirmative response to the sender of the credential when it proves the sender's identity as an authorized user.

Figure 17:
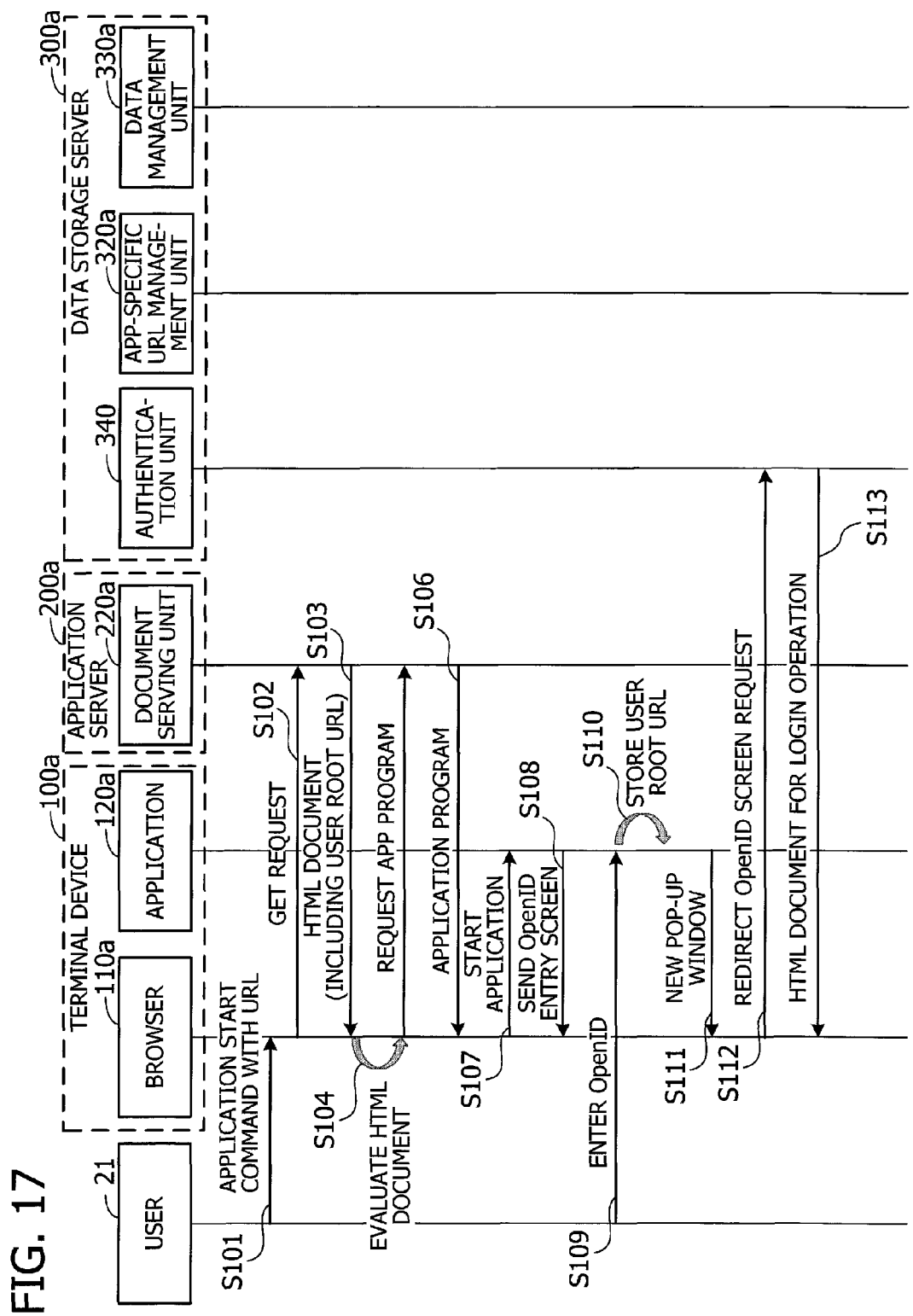
FIG. 17 is a first half of a sequence diagram illustrating an exemplary procedure executed in the fifth embodiment.

FIG. 17 is a first half of a sequence diagram illustrating an exemplary procedure executed in the fifth embodiment. Each operation in FIG. 17 is described below in the order of step numbers.

(Step S101) The user 21 enters an application start command to the browser 110a in his or her terminal device 100a, specifying URL of an application server 200a.

(Step S102) The browser 110 transmits a GET request that specifies the entered URL to the application server 200a.

(Step S103) Upon receipt of the GET request, the document serving unit 220a in the application server 200a retrieves an HTML document from the specified location in the storage unit 210a. The document serving unit 220a transmits this HTML document back to the requesting terminal device 100a.

(Step S104) The browser 110a in the terminal device 100a evaluates the HTML document received from the application server 200a.

(Step S105) When an object embedding tag is detected in the HTML document, and if the tag specifies an application program 214, the browser 110a sends a request to the application server 200a to get that application program 214.

(Step S106) The document serving unit 220a in the application server 200a retrieves the requested application program 214 from the storage unit 210a and transmits it to the requesting terminal device 100a.

(Step S107) The browser 110a in the terminal device 100a stores the received application program 214 in its local RAM 102, for example. The browser 110a then sends the OS an execution command for the application program 214, thus starting an application 120a.

(Step S108) The started application 120a sends data of an OpenID entry screen to the browser 110a. The browser 110a produces a screen on the monitor 11 to prompt the user to enter his or her OpenID (see FIG. 18).

(Step S109) The user 21 enters a user root URL as his or her OpenID to application 120a in the terminal device 100a.

(Step S110) The application 120a stores the user root URL that the user 21 has entered as his or her OpenID.

(Step S111) The application 120a requests the browser 110a to produce a new pop-up window. For example, the User Experience (UX) Extension, an authentication technique of OpenID, may be used for this pop-up window.

(Step S112) The browser 110a redirects the above OpenID screen request to the data storage server 300a.

(Step S113) In response to the OpenID screen request, the authentication unit 340 in the data storage server 300a sends an HTML document to the terminal device 100a for login operation. Based on this HTML document, the browser 110a in the terminal device 100a produces a pop-up log-in window (see FIG. 19).

Figure 18:
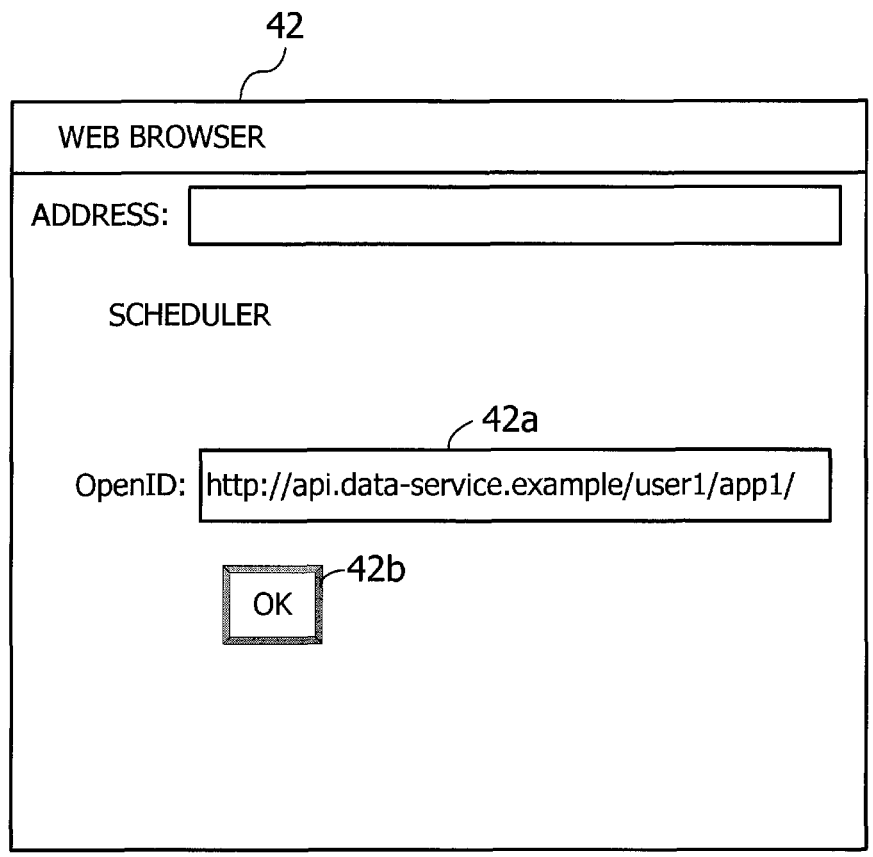
FIG. 18 illustrates an example of an OpenID entry screen.

FIG. 18 illustrates an example of an OpenID entry screen. This OpenID entry screen 42 has a text box 42a for entry of an OpenID, and an OK button 42b. The user 21 types a user root URL in the text box 42a and presses the OK button 42b using a mouse 13 or the like, thus causing the entered user root URL to be passed as an OpenID to the application 120a.

Afterwards, the browser 110a produces a pop-up window for login operation, in response to a request from the application 120a.

Figure 19:
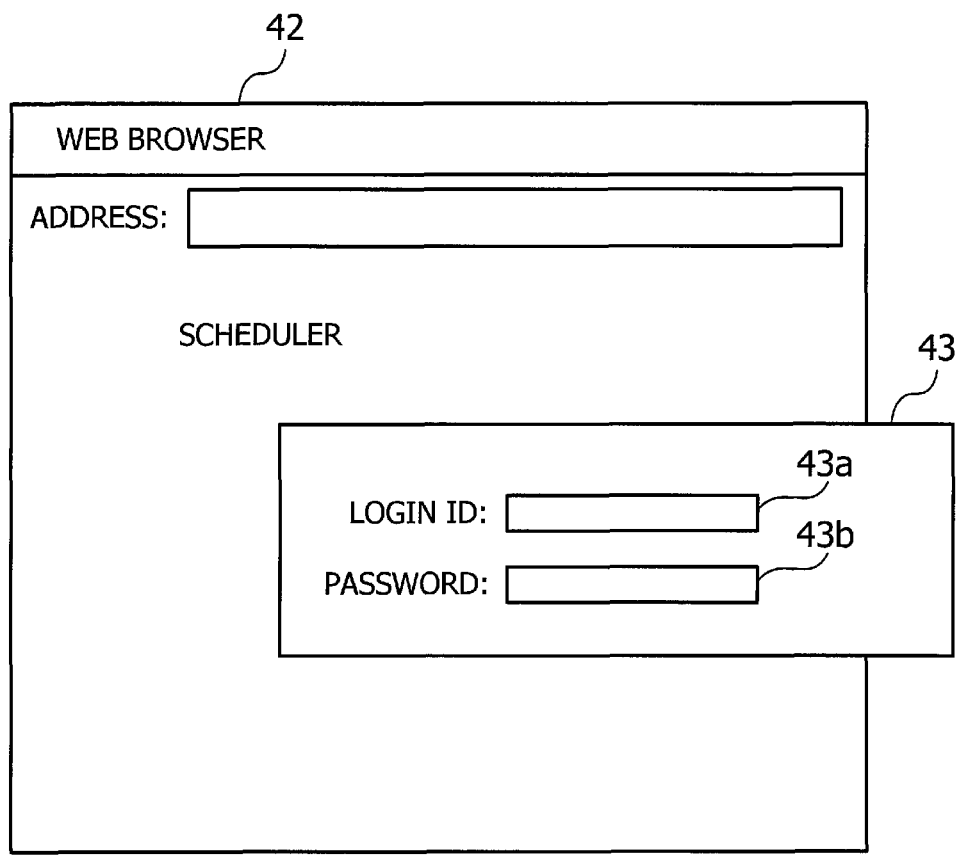
FIG. 19 illustrates an example of a pop-up login window.

FIG. 19 illustrates an example of a pop-up login window. The illustrated login window 43 contains a text box 43a for entry of a login ID and another text box 43b for entry of a password. With this screen of the terminal device 100a, the fifth embodiment proceeds to the next processing seen in FIG. 20.

Figure 20:
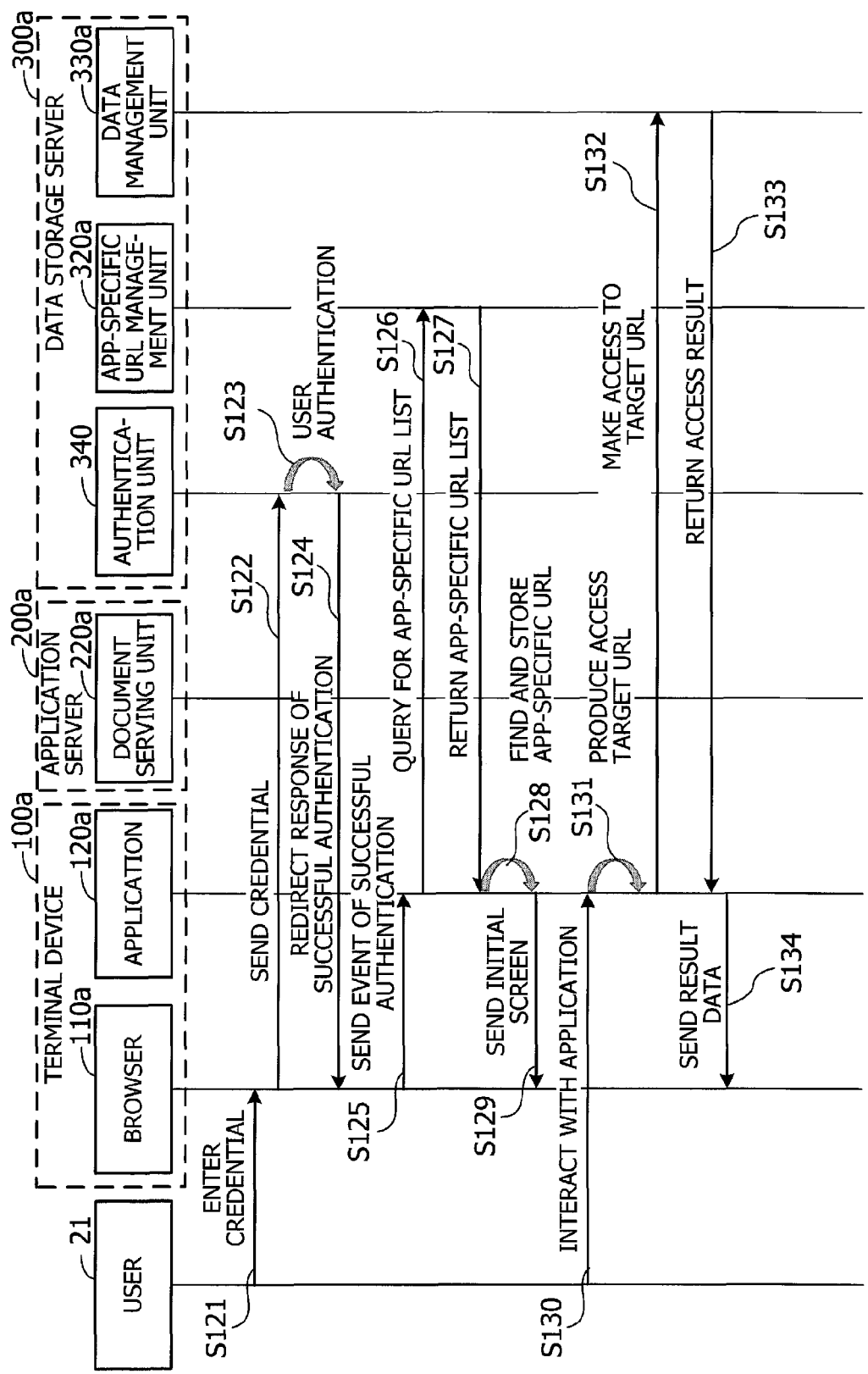
FIG. 20 is a second half of the sequence diagram illustrating an exemplary procedure executed in the fifth embodiment.

FIG. 20 is a second half of the sequence diagram illustrating an exemplary procedure executed in the fifth embodiment. Each operation in FIG. 20 is described below in the order of step numbers.

(Step S121) The user 21 enters a credential in the login window 43 to prove his or her legitimacy. For example, the user 21 enters his or her ID into one text box 43a in the login window 43. This ID is supposed to have been registered with the data storage server 300a. The user also enters his or her password into another text box 43b. The entered ID-password pair serves as the login credential of the user 21.

(Step S122) The browser 110a in the terminal device 100a sends the entered credential to the data storage server 300a.

(Step S123) In the data storage server 300a, the authentication unit 340 executes authentication of the user 21 based on the received credential.

(Step S124) When the user 21 is authenticated properly, the authentication unit 340 sends the terminal device 100a a redirect response indicating the successful authentication.

(Step S125) In the terminal device 100a, the browser 110a informs the application 120a of the event of successful authentication.

(Step S126) Because of the successful authentication, the application 120a is sure that what the user 21 has entered as an OpenID at step S109 is his or her genuine user root URL. Accordingly, the application 120a sends a query for an application-specific URL list to the data storage server 300a, specifying the confirmed user root URL of the user 21.

The subsequent steps S127 to S134 are similar to step S22 to S29 discussed in FIG. 10 for the second embodiment.

The above-described steps permit an application to obtain a correct user root URL proved through an OpenID authentication. The use of OpenID enables the user to have access to a plurality of applications with a single credential. What this means to the user is a reduced burden of credential management.

[Sixth Embodiment]

This section describes a sixth embodiment. The sixth embodiment implements a combination of the foregoing third application execution mode, second method for obtaining user root URLs, and third method for determining application-specific URLs. It is noted that no application servers are used in the sixth embodiment, unlike the foregoing second to fifth embodiments.

Figure 21:
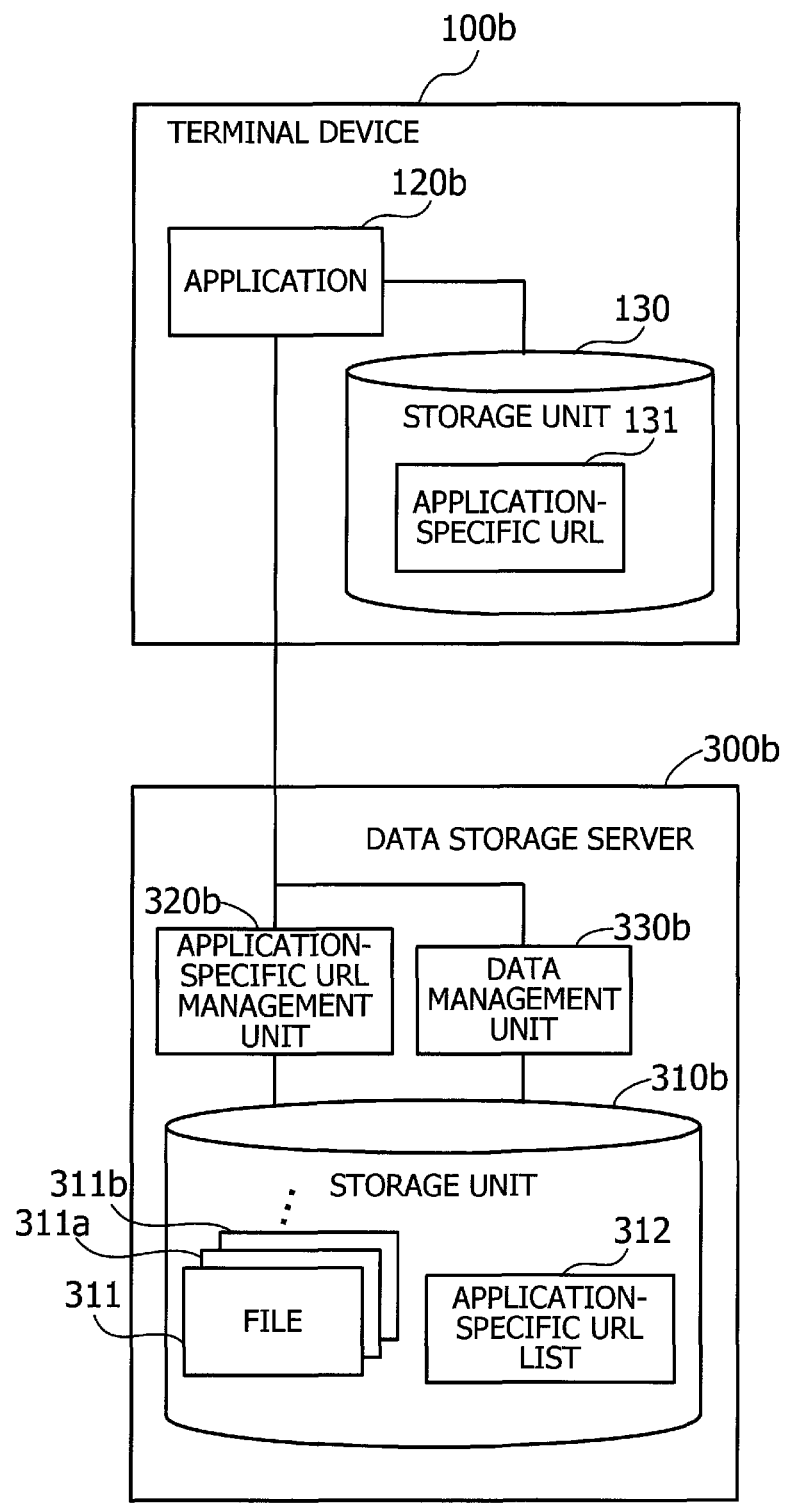
FIG. 21 is a block diagram illustrating functions of devices used in a sixth embodiment.

FIG. 21 is a block diagram illustrating functions of devices used in the sixth embodiment. The illustrated terminal device 100b includes an application 120b and a storage unit 130. The application 120b has previously been installed in the terminal device 100b. Besides providing the same functions as the application 120 discussed in FIG. 9, the application 120b according to the sixth embodiment accepts entry of user root URLs and produces its own display screens without intervention of browsers. The storage unit 130 stores an application-specific URL 131 obtained from the data storage server 300b.

The data storage server 300b includes a storage unit 310b, an application-specific URL management unit 320b, and a data management unit 330b. These components of the data storage server 300b function in the same way as their respective counterparts in the data storage server 300 according to the second embodiment discussed in FIG. 5.

Figure 22:
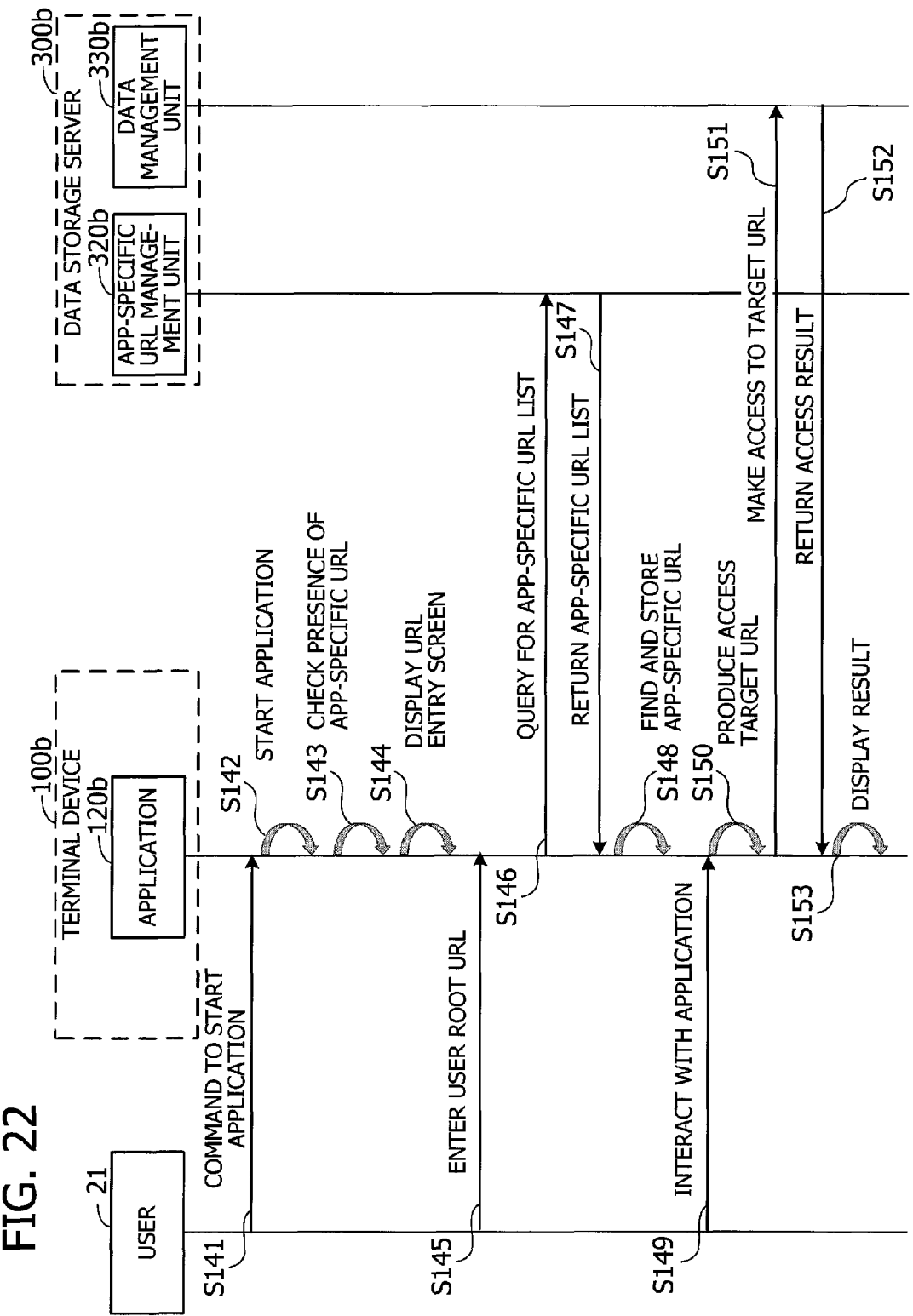
FIG. 22 is a sequence diagram illustrating an exemplary procedure executed in the sixth embodiment.

FIG. 22 is a sequence diagram illustrating an exemplary procedure executed in the sixth embodiment. Each operation in FIG. 22 is described below in the order of step numbers.

(Step S141) The user 21 enters an application start command to the terminal device 100b.

(Step S142) The application 120b is thus started in accordance with the start command.

(Step S143) The application 120b checks whether it already has an application-specific URL.

Figure 23:
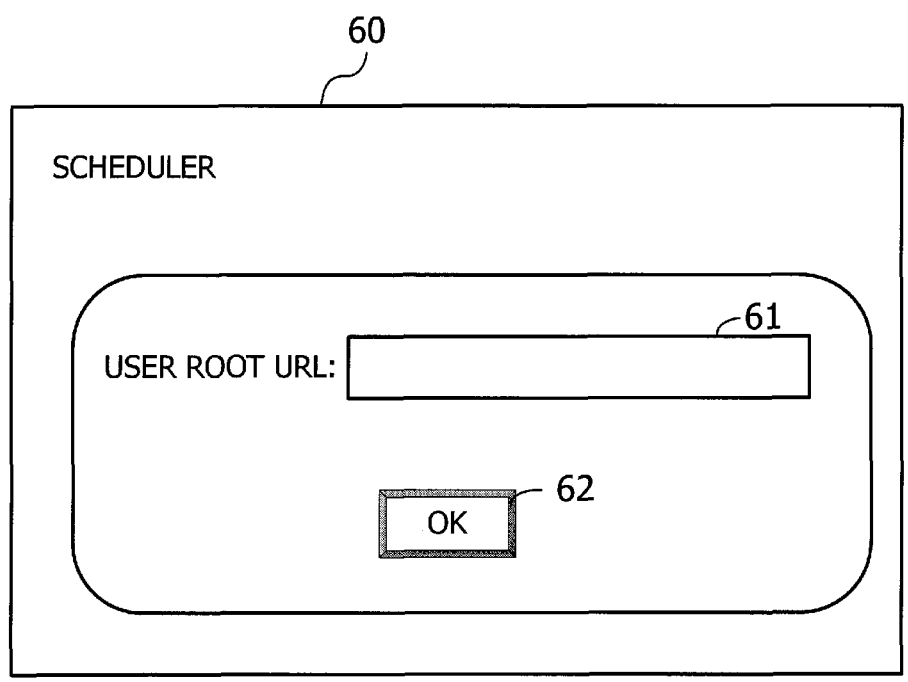
FIG. 23 illustrates an example of a user root URL entry screen.

(Step S144) If no application-specific URL is present, the application 120b displays a user root URL entry screen on the monitor 11 (see FIG. 23).

(Step S145) The user 21 enters his or her user root URL in the user root URL entry screen.

(Step S146) The started application 120b in the terminal device 100b issues a query for an application-specific URL list to the data storage server 300b, based on the user root URL entered by the user 21.

(Step S147) In response to the query from the terminal device 100*b*, the application-specific URL management unit 320*b* in the data storage server 300*b* returns an application-specific URL list 312 to the terminal device 100*b*.

(Step S148) In the terminal device 100*b*, the application 120*b* searches the received application-specific URL list 312 to find out which application-specific URL is relevant to the application 120*b* itself. The application 120*b* then stores its own application-specific URL locally.

(Step S149) The user 21 operates his or her keyboard 12 and mouse 13 to enter a command for the application 120*b* to execute data processing operations.

(Step S150) The application 120*b* executes data processing operations requested by the user 21. To use personal data of the user 21, the application 120*b* produces an access target URL of the personal data by appending its application local path to the application-specific URL.

(Step S151) The application 120*b* makes access to the data storage server 300*b*, specifying the produced access target URL.

(Step S152) In the data storage server 300*b*, the data management unit 330*b* executes access to the specified access target URL and returns its result to the terminal device 100*b*.

(Step S153) The application 120*b* in the terminal device 100*b* continues the data processing operations according to the access result received from the data storage server 300*b*. The application 120*b* displays the result of data processing operations on a screen of the monitor 11.

FIG. 23 illustrates an example of a user root URL entry screen. The illustrated user root URL entry screen 60 contains a text box 61 for entry of a user root URL, and an OK button 62. The user 21 types his or her user root URL in the text box 61 and then presses the OK button 62, thus entering the user root URL to the application 120*b*.

As can be seen from the above, the sixth embodiment enables the data storage server 300*b* to manage personal data of the user 21 for use by a pre-installed application 120*b* in the terminal device 100*b*.

[Seventh Embodiment]

This section describes a seventh embodiment. The seventh embodiment implements a combination of the foregoing second application execution mode, second method for obtaining user root URLs, and second method for determining application-specific URLs.

Figure 24:
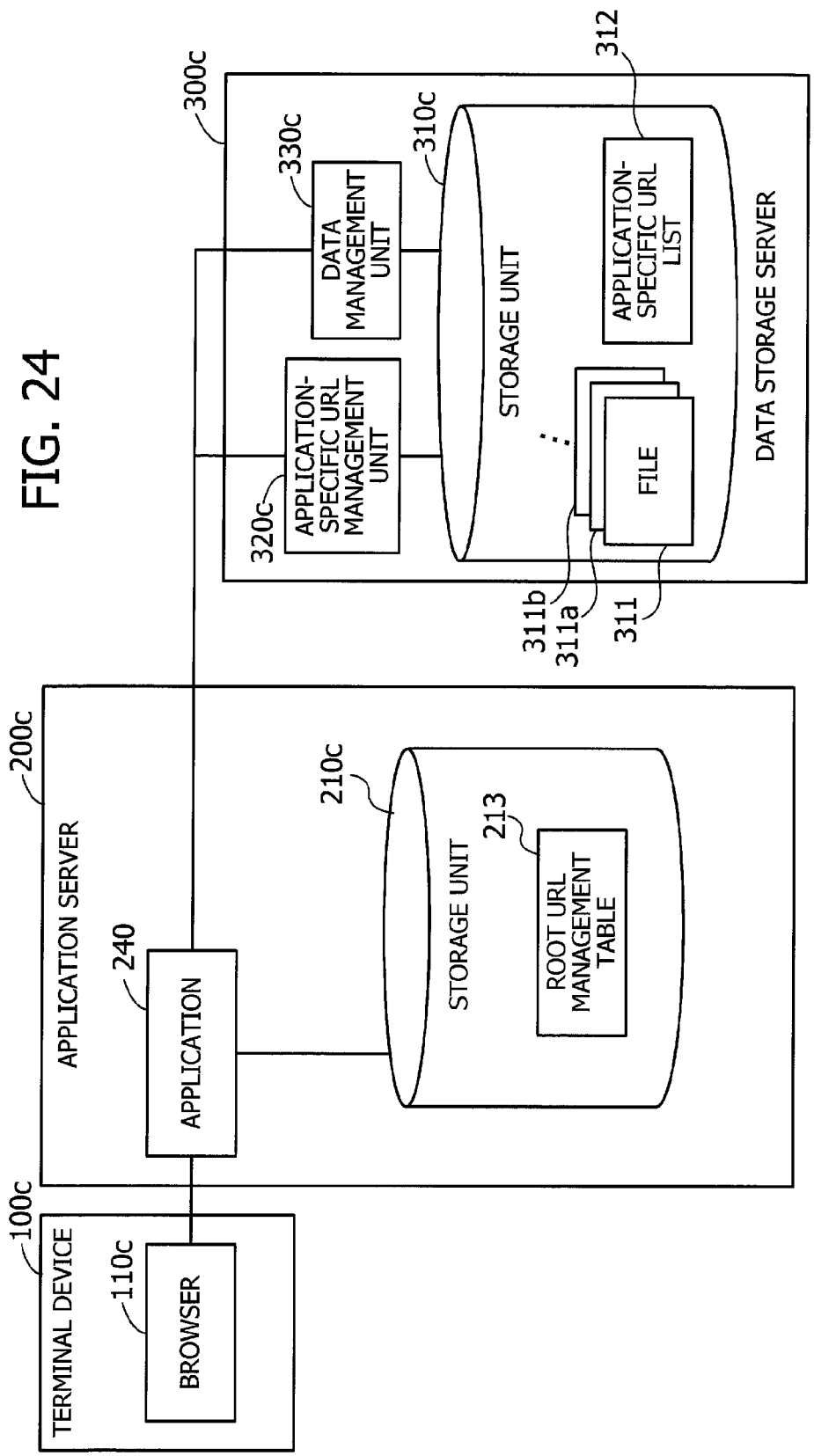
FIG. 24 is a block diagram illustrating functions of devices used in a seventh embodiment.

FIG. 24 is a block diagram illustrating functions of devices used in the seventh embodiment. The illustrated terminal device 100*c* includes a browser 110*c* that functions in the same way as the browser 110 discussed in FIG. 5 for the second embodiment.

The illustrated application server 200*c* includes a storage unit 210*c* and an application 240.

The storage unit 210*c* stores a root URL management table 213. The application 240 functions in the same way as the application 120 discussed in FIG. 9 for the second embodiment, except that it is configured to communicate with the browser 110*c* via a network 10. The application 240 obtains a user root URL from the root URL management table 213 in the storage unit 210*c*.

The illustrated data storage server 300*c* includes a storage unit 310*c*, an application-specific URL management unit 320*c*, and a data management unit 330*c*. These components of the data storage server 300*c* function in the same way as their respective counterparts in the data storage server 300 discussed in FIG. 5 for the second embodiment.

Figure 25:
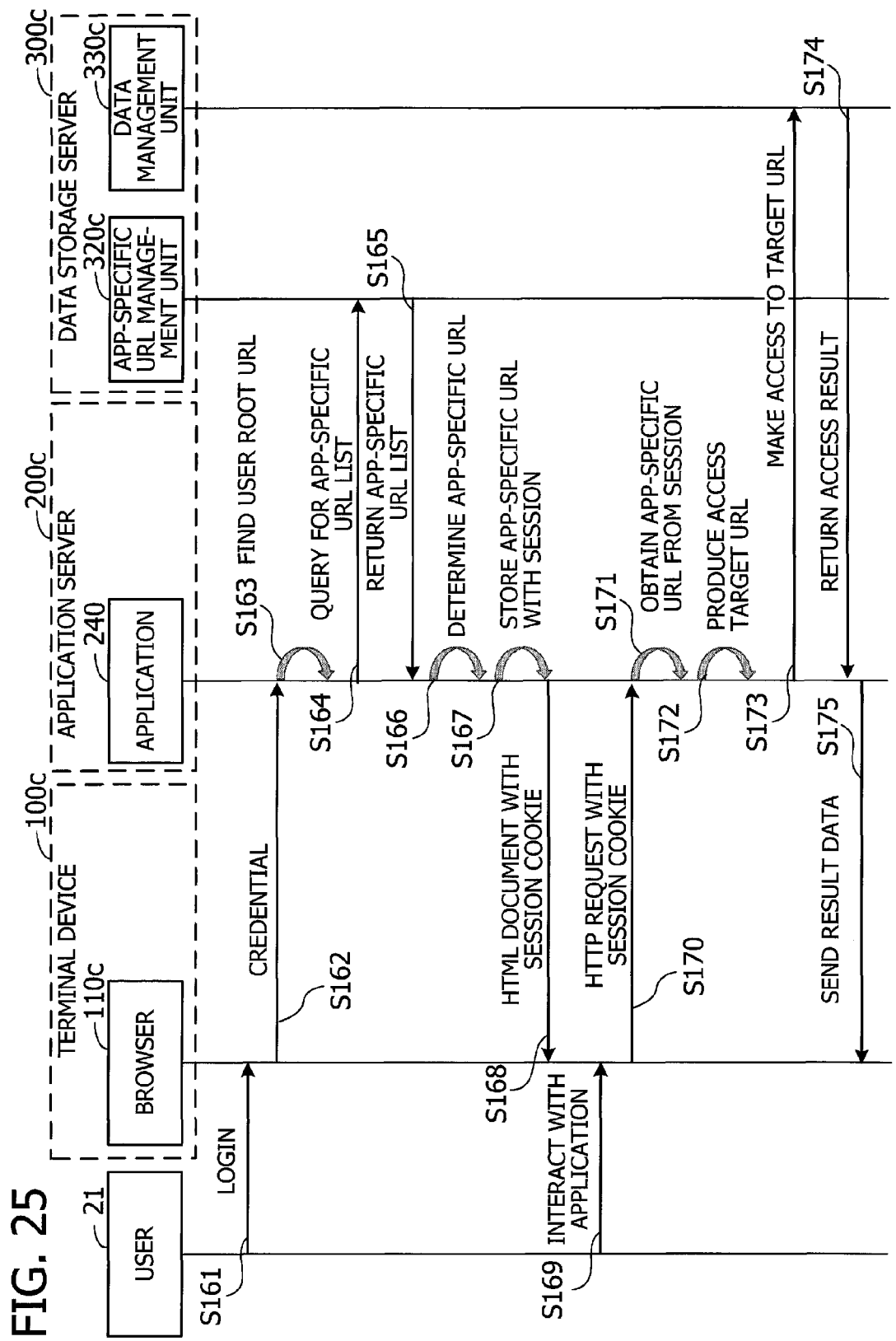
FIG. 25 is a sequence diagram illustrating an exemplary procedure executed in the seventh embodiment.

FIG. 25 is a sequence diagram illustrating an exemplary procedure executed in the seventh embodiment. Each operation in FIG. 25 is described below in the order of step numbers.

Figure 26:
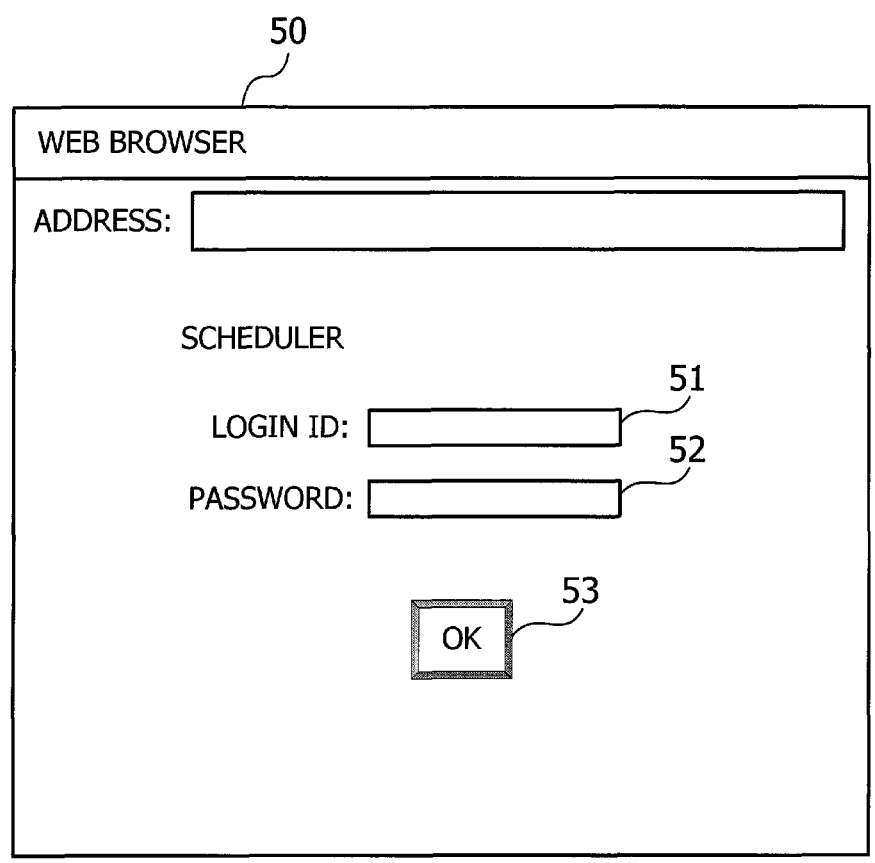
FIG. 26 illustrates an example of a login screen.

(Step S161) The user 21 logs in to an application 240 through a login screen produced by the browser 110*c* in the terminal device 100*c* (see FIG. 26). Here the user 21 specifies the application 240 by entering its URL.

(Step S162) The browser 110*c* sends a credential to the application server 200*c*. This credential may be, for example, a combination of the user's ID and password.

(Step S163) In the application server 200*c*, the application 240 performs user authentication upon receipt of the credential. When the user 21 is authenticated properly, the application 240 consults the root URL management table 213 to find a user root URL associated with user ID of the user 21.

(Step S164) The application 240 issues a query for an application-specific URL list to the data storage server 300*c*, specifying the above user root URL.

(Step S165) In response to the query from the application server 200*c*, the application-specific URL management unit 320*c* in the data storage server 300*c* returns an application-specific URL list 312 to the requesting application server 200*c*.

(Step S166) In the application server 200*c*, the application 240 searches the received application-specific URL list 312 to find out which application-specific URL is relevant to the application 240 itself.

(Step S167) The application 240 stores its own application-specific URL, associating the URL with the current communication session with the terminal device 100*c*.

(Step S168) The application 240 sends the terminal device 100*c* an HTML document having a session cookie. In the terminal device 100*c*, the browser 110*c* displays a screen for the application 240 on the monitor 11.

(Step S169) Viewing the screen on the monitor 11, the user 21 operates his or her keyboard 12 and mouse to enter a command to the application 240 via the browser 110*c*.

(Step S170) In response to the command from the user 21, the browser 110*c* sends the application server 200*c* an HTTP request with a session cookie.

(Step S171) The application 240 in the application server 200*c* executes requested data processing operations. During this course, the application 24 may use personal data of the user 21. In that case, the application 240 obtains an application-specific URL associated with its current communication session with the terminal device 100*c*.

(Step S172) The application 240 produces an access target URL by appending an application local path to the obtained application-specific URL.

(Step S173) The application 240 makes access to the data storage server 300*c*, specifying the produced access target URL.

(Step S174) In the data storage server 300*c*, the data management unit 330*c* executes access to the specified access target URL and returns its result to the application server 200*c*.

(Step S175) The application 240 in the application server 200*c* continues the data processing operations according to the access result received from the data storage server 300*c*. The application 240 then sends data indicating the result of data processing operations back to the terminal device 100*c*. In response, the browser 110*c* in the terminal device 100*c* produces a screen on the monitor 11 to display what the application has done.

FIG. 26 illustrates an example of a login screen. This login screen 50 contains a text box 51 for entry of a login ID, another text box 52 for entry of a password, and an OK button 53. The user 21 types his or her user ID in the former text box 51 and password in the latter text box 52. The user 21 then presses the OK button 532, causing the entered combination of user ID and password to be sent as the user's credential to the application server 200c. This credential permits the application server 200c to determine a user root URL associated with the user ID.

As can be seen from the above, the seventh embodiment enables the data storage server 300c to manage personal data of the user 21 for access from an application 240 running on an application server 200c.

[Other Embodiments]

While the first method for obtaining user root URLs is not explained in the above-described embodiments, the first method is actually used as part of the procedure of the second method for obtaining user root URLs. Referring to, for example, the sequence diagram of FIG. 22, what is done at steps S144 and S145 of the sixth embodiment corresponds to the first method for obtaining user root URLs.

The functions of the above-described embodiments may be implemented as a computer application. That is, computer programs are provided for each of the terminal device, application server, and data storage server to implement the functions that these devices are supposed to do. Computers execute such programs to realize the processing functions discussed in the preceding sections. The programs may be encoded in a computer-readable storage medium. Computer-readable storage media include magnetic storage devices, optical discs, magneto-optical storage media, semiconductor memory devices, and others. Magnetic storage devices include hard disk drives (HDD), flexible disks (FD), and magnetic tapes, for example. Optical disc media include DVD, DVD-RAM, CD-ROM, CD-RW, and others. Magneto-optical storage media include magneto-optical discs (MO), for example.

Portable storage media, such as DVD and CD-ROM, are used for distribution of program products. Network-based distribution of programs may also be possible, in which case several master program files are made available on a server computer for downloading to other computers via a network.

For example, a computer stores programs in its local storage device, which have previously been installed from a portable storage medium or downloaded from a server computer. The computer executes programs read out of the local storage device, thereby performing the programmed functions. Where appropriate, the computer may execute a program read out of a portable storage medium, without installing them in its local storage device. Another alternative method is that the computer executes a program upon downloading from a server computer.

It is further noted that the above processing functions may be executed wholly or partly by a digital signal processor (DSP), application-specific integrated circuit (ASIC), programmable logic device (PLD), or other electronic circuits.

The proposed techniques make it easier to manage personal data of a user in a user-specified data storage device, for use in data processing operations.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An information processing apparatus comprising:
a processor configured to perform a process including:
obtaining first location information indicating an identifier of a personal data service of a user and a location of a user-specified directory with the personal data service, the user-specified directory being specified to store personal data of the user;
producing, based on the first location information, second location information indicating a location of an application-specific directory which is uniquely assigned to an application, the application-specific directory being located below the user-specified directory;
determining if there is a need to access the personal data of the user;
producing, when it is determined there is the need to access the personal data of the user, first access target information that indicates a relative path and name of a target data file including the personal data of the user;
producing, based on the second location information and the first access target information, second access target information indicating a storage location and name of the target data file, the first access target information being subordinated to the second location information; and
accessing the target data file in the data storage device, based on the second access target information, so that the target data file is used to execute the application requested by the user.

2. The information processing apparatus according to claim 1, wherein:
the information processing apparatus is configured to execute two or more applications; and
the producing second location information includes: obtaining an application-specific URL list describing locations of a plurality of application-specific directories that are placed below the user-specified directory and uniquely assigned to the respective applications, and extracting from the application-specific URL list the location of the application-specific directory assigned to one of the applications that is currently executed in response to a request from the user.

3. The information processing apparatus according to claim 2, wherein the producing second location information includes obtaining the application-specific URL list from the data storage device.

4. The information processing apparatus according to claim 1, wherein the producing second location information includes: sending the data storage device a location information request including an identifier of the application, and receiving information on the location of the application-specific directory that is uniquely assigned to the application, as a response from the data storage device.

5. The information processing apparatus according to claim 1, wherein the second location information is obtained by following a predetermined set of rules.

6. The information processing apparatus according to claim 1, wherein:
the application is coded in a program stored in an apparatus; and
the accepting first location information includes: sending the apparatus a request for the program of the application, together with an identifier of the user, and receives the first location information together with the program as a response from the apparatus.

7. The information processing apparatus according to claim 1, wherein the accepting first location information includes receiving the first location information upon authentication of the user, from an apparatus that has authenticated the user.

8. The information processing apparatus according to claim 1, wherein the accepting first location information includes receiving the first location information specified by the user.

9. The information processing apparatus according to claim 8, further comprising a storage unit configured to store the first location information, wherein the accepting first location information includes entering the first location information into the storage unit upon receipt thereof from the user, and retrieving the first location information from the storage unit.

10. The information processing apparatus according to claim 8, wherein the accepting first location information includes obtaining the first location information from a terminal device via a network, the first location information having been entered to the terminal device by the user.

11. The information processing apparatus according to claim 1, wherein the data storage device is linked to the information processing apparatus via a network.

12. The information processing apparatus according to claim 1, wherein:
the data storage device specified by the user is a physical data storage device; and
the first location information indicates the location of the user-specified directory in the physical data storage device.

13. The information processing apparatus according to claim 1, wherein the second access target information is produced such that a single directory unique to the user be provided in the data storage device.

14. A non-transitory computer-readable storage medium encoded with a program which causes a computer to perform a process comprising:
obtaining first location information indicating an identifier of a personal data service of a user and a location of a user-specified directory within the personal data service, the first location information also indicating a location of a user-specified directory within the data storage device, the user-specified directory being specified to store personal data of the user;
producing, based on the first location information, second location information indicating a location of an application-specific directory which is uniquely assigned to an application, the application-specific directory being located below the user-specified directory;
determining if there is a need to access the personal data of the user;
producing, when it is determined there is the need to access the personal data of the user, first access target information that indicates a relative path and name of a target data file including the personal data of the user;
producing, based on the second location information and the first access target information, second access target information indicating a storage location and name of the target data file, the first access target information being subordinated to the second location information; and
accessing the target data file in the data storage device, based on the second access target information, so that the target data file is used to execute the application requested by the user.

* * * * *